(12) United States Patent
Nakano et al.

(10) Patent No.: US 9,594,663 B2
(45) Date of Patent: Mar. 14, 2017

(54) APPARATUS AND METHOD FOR COLLECTING LOG INFORMATION FROM A PLURALITY OF SERVERS

(75) Inventors: Masahisa Nakano, Kawasaki (JP); Kouichi Hidaka, Kawasaki (JP); Kazuo Mineno, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 871 days.

(21) Appl. No.: 13/591,526

(22) Filed: Aug. 22, 2012

(65) Prior Publication Data
US 2013/0054680 A1 Feb. 28, 2013

(30) Foreign Application Priority Data

Aug. 23, 2011 (JP) ................. 2011-181957

(51) Int. Cl.
*G06F 15/16* (2006.01)
*G06F 11/34* (2006.01)
*H04L 29/08* (2006.01)
*G06F 12/00* (2006.01)

(52) U.S. Cl.
CPC ...... *G06F 11/3476* (2013.01); *G06F 11/3495* (2013.01); *H04L 29/08072* (2013.01)

(58) Field of Classification Search
CPC . G06F 11/3476; G06F 11/3495; H04L 41/069
USPC ................. 709/203, 219–229, 250
See application file for complete search history.

(56) References Cited

U.S. PATENT DOCUMENTS

| | | | |
|---|---|---|---|
| 6,052,728 A | 4/2000 | Fujiyama et al. | |
| 6,230,198 B1 * | 5/2001 | Dawson et al. | 709/224 |
| 6,311,213 B2 * | 10/2001 | Dawson et al. | 709/217 |
| 6,553,378 B1 * | 4/2003 | Eschelbeck | |
| 2003/0120663 A1 * | 6/2003 | Vining et al. | 707/100 |
| 2005/0193394 A1 * | 9/2005 | Benhase et al. | 719/318 |

(Continued)

FOREIGN PATENT DOCUMENTS

| | | |
|---|---|---|
| JP | 6-4363 | 1/1994 |
| JP | 8-106408 | 4/1996 |

(Continued)

OTHER PUBLICATIONS

Japanese Office Action issued Feb. 17, 2015 in corresponding Japanese Patent Application No. 2011-181957.

(Continued)

*Primary Examiner* — Zarni Maung
(74) *Attorney, Agent, or Firm* — Staas & Halsey LLP

(57) ABSTRACT

A server apparatus is provided for collecting log information from a plurality of servers that execute a series of processes in response to a first request from a client apparatus. The server apparatus receives, from a first server that is included in the plurality of servers and has executed a first process of the series of processes, a second request for executing a second process of the series of processes, where the first request includes first log information that is outputted from the first server when the first process is executed by the first server. The server apparatus executes the second process while outputting second log information indicating an execution history of the second process, and controls writing of the first and second log information into a predetermined storage area provided in association with the client apparatus.

11 Claims, 16 Drawing Sheets

(56) References Cited

U.S. PATENT DOCUMENTS

2006/0015612 A1    1/2006  Shimazaki et al.

FOREIGN PATENT DOCUMENTS

| | | |
|---|---|---|
| JP | 10-198616 | 7/1998 |
| JP | 2002-244887 | 8/2002 |
| JP | 2005-157727 | 6/2005 |
| JP | 2005-276053 | 10/2005 |
| JP | 2005-346414 | 12/2005 |
| JP | 2008-15733 | 1/2008 |
| JP | 2008-228027 | 9/2008 |
| JP | 2010-118072 | 5/2010 |

OTHER PUBLICATIONS

Office Action issued by the Japanese Patent Office on Oct. 27, 2015 in corresponding Japanese patent application No. 2011-181957.
Song et al., "Evaluation of Relationship Extraction Methods between Web pages and Files based on Co-Occurrence Frequency", DEIM Forum 2011 D4-5, Collected paper of 3rd Forum on Data Engineering and Information Management, Data Engineering Special Committee of The Institute of Electronics, Information and Communication Engineers (IEICE).

* cited by examiner

FIG. 7

```
<?xml version="1.0" encoding="UTF-8"?>
<LogRequest version="1.0">
 <clientinfo>
   <IP>192.168.10.1</IP>
 </clientinfo>
 <log>
   <collectlog>tracelog</collectlog>
   <logging>yes</logging>
   <loglevel>debuglog</loglevel>
 </log>
 <log>
   <collectlog>sequencelog</collectlog>
   <logging>yes</logging>
   <loglevel>debuglog</loglevel>
 </log>
</LogRequest>
```

- 710: `<clientinfo>...<IP>192.168.10.1</IP></clientinfo>`
- 721: `<collectlog>tracelog</collectlog>`
- 722: `<logging>yes</logging>`
- 723: `<loglevel>debuglog</loglevel>`
- 731: `<collectlog>sequencelog</collectlog>`
- 732: `<logging>yes</logging>`
- 733: `<loglevel>debuglog</loglevel>`

FIG. 8

```
<?xml version="1.0" encoding="UTF-8"?>
<LogRequest version="1.0">
 <clientinfo>
   <IP>192.168.10.2</IP>
 </clientinfo>
 <log>
   <collectlog>tracelog</collectlog>
   <logging>yes</logging>
   <loglevel>errlog</loglevel>
 </log>
 <log>
   <collectlog>sequencelog</collectlog>
   <logging>yes</logging>
   <loglevel>errlog</loglevel>
 </log>
</LogRequest>
```

- 810: `<clientinfo>...<IP>192.168.10.2</IP></clientinfo>`
- 821: `<collectlog>tracelog</collectlog>`
- 822: `<logging>yes</logging>`
- 823: `<loglevel>errlog</loglevel>`
- 831: `<collectlog>sequencelog</collectlog>`
- 832: `<logging>yes</logging>`
- 833: `<loglevel>errlog</loglevel>`

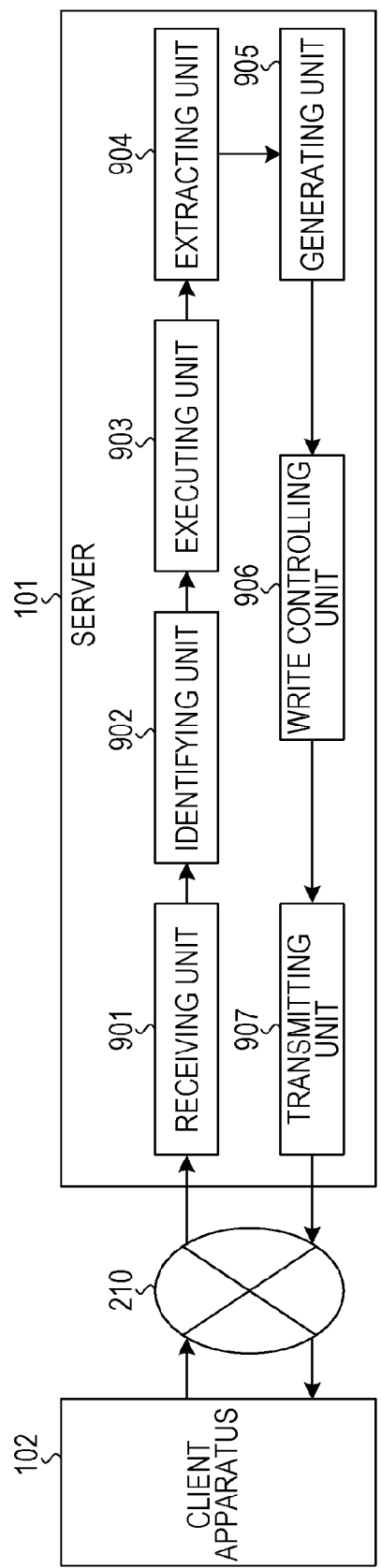

FIG. 15

```
<?xml version="1.0" encoding="UTF-8"?>
<LogResponse version="1.0">
 <serverinfo>
  <IP>192.168.58.4</IP>      } 1510
 </serverinfo>
 <log>
  <collectlog>tracelog</collectlog>    } 1521
  <logdata>2011/06/28 11:42:35,esistart,DEBUG:   } 1522
DEBUG99999,xxxxx</logdata>
 </log>
 <log>
  <collectlog>sequencelog</collectlog>   } 1531
  <logdata>2011/06/28 11:42:33,esistart,DEBUG:   } 1532
DEBUG99999,yyyyy</logdata>
 </log>
</LogResponse>
```

FIG. 16

```
<?xml version="1.0" encoding="UTF-8"?>
<LogResponse version="1.0">
 <serverinfo>
  <IP>192.168.58.4</IP>      } 1610
 </serverinfo>
 <log>
  <collectlog>tracelog</collectlog>    } 1621
  <logdata>2011/06/28 12:13:25,esistart,ERROR: esi10352,xxxxx</   } 1622
logdata>
 </log>
 <log>
  <collectlog>sequencelog</collectlog>   } 1631
  <logdata>2011/06/28 12:13:32,esistart,ERROR: esi30151,yyyyy</   } 1632
logdata>
 </log>
</LogResponse>
```

APPARATUS AND METHOD FOR COLLECTING LOG INFORMATION FROM A PLURALITY OF SERVERS

CROSS-REFERENCE TO RELATED APPLICATION

This application is based upon and claims the benefit of priority of the prior Japanese Patent Application No. 2011-181957, filed on Aug. 23, 2011, the entire contents of which are incorporated herein by reference.

FIELD

The embodiment discussed herein is related to an apparatus and method for collecting log information from a plurality of servers.

BACKGROUND

Typically, in a system in which a series of processes corresponding to a request from a client apparatus is executed by multiple servers, logs of the processes executed by the servers are stored on the respective servers. For analyzing the logs, for example, a computer for analyzing the logs collects the logs stored in the individual servers and analyzes the collected logs.

One example of related art is a technology in which, when a client issues a transaction-processing request to a server, a transaction identifier including date and time of the request and the name of an apparatus that performs processing is issued and is attached to a transaction. After the transaction is finished, a log is collected on the basis of the transaction identifier attached to the transaction.

There is also a technology in which the identifier of a session desired to be established between a client computing unit and a computing unit at another end of communication is sequentially transmitted to multiple relay computing units on a communication channel after a connection is established, the identifier of the session is added to a log, and the resulting log is recorded. There is also a technology in which, upon reception of an electronic-message request, a server attaches information specifying whether or not to sample a trace and the identifier of the electronic-message request to the electronic-message request, and upon reception of the electronic-message request to which the information and the identifier are attached, trace information containing the identifier is recorded during execution of an application on the basis of the information.

Examples of the related art are disclosed in Japanese Laid-open Patent Publication Nos. 2002-244887, 10-198616, and 2010-118072.

SUMMARY

According to an aspect of the invention, a server apparatus is provided for collecting log information from a plurality of servers that execute a series of processes in response to a first request from a client apparatus, where the server apparatus serves as one of the plurality of servers. The server apparatus receives, from a first server that is included in the plurality of servers and has executed a first process of the series of processes, a second request for executing a second process of the series of processes, where the first request includes first log information that is outputted from the first server when the first process is executed by the first server. The server apparatus executes the second process while outputting second log information indicating an execution history of the second process, and controls writing of the first and second log information into a predetermined storage area provided in association with the client apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a log-data reporting request, according to an embodiment;

FIG. 8 is a diagram illustrating an example of a log-data reporting request, according to an embodiment;

FIG. 9 is a diagram illustrating a configuration example of a server, according to an embodiment;

FIG. 15 is a diagram illustrating an example of log data, according to an embodiment;

FIG. 16 is a diagram illustrating an example of log data, according to an embodiment;

DESCRIPTION OF EMBODIMENT

In the above mentioned related art, even when only part of multiple servers operating in a system executes a series of processes to be executed in the system in response to a request, logs are collected from each of all the multiple servers operating in the system during log analysis. Thus, there is a problem that the amount of log data collected may be significantly large.

A server apparatus, a system, and a log-collection assistance method according to embodiments will be described below in detail with reference to the accompanying drawings.

(An Example of Log-Collection Assistance Method)

Figure 1:
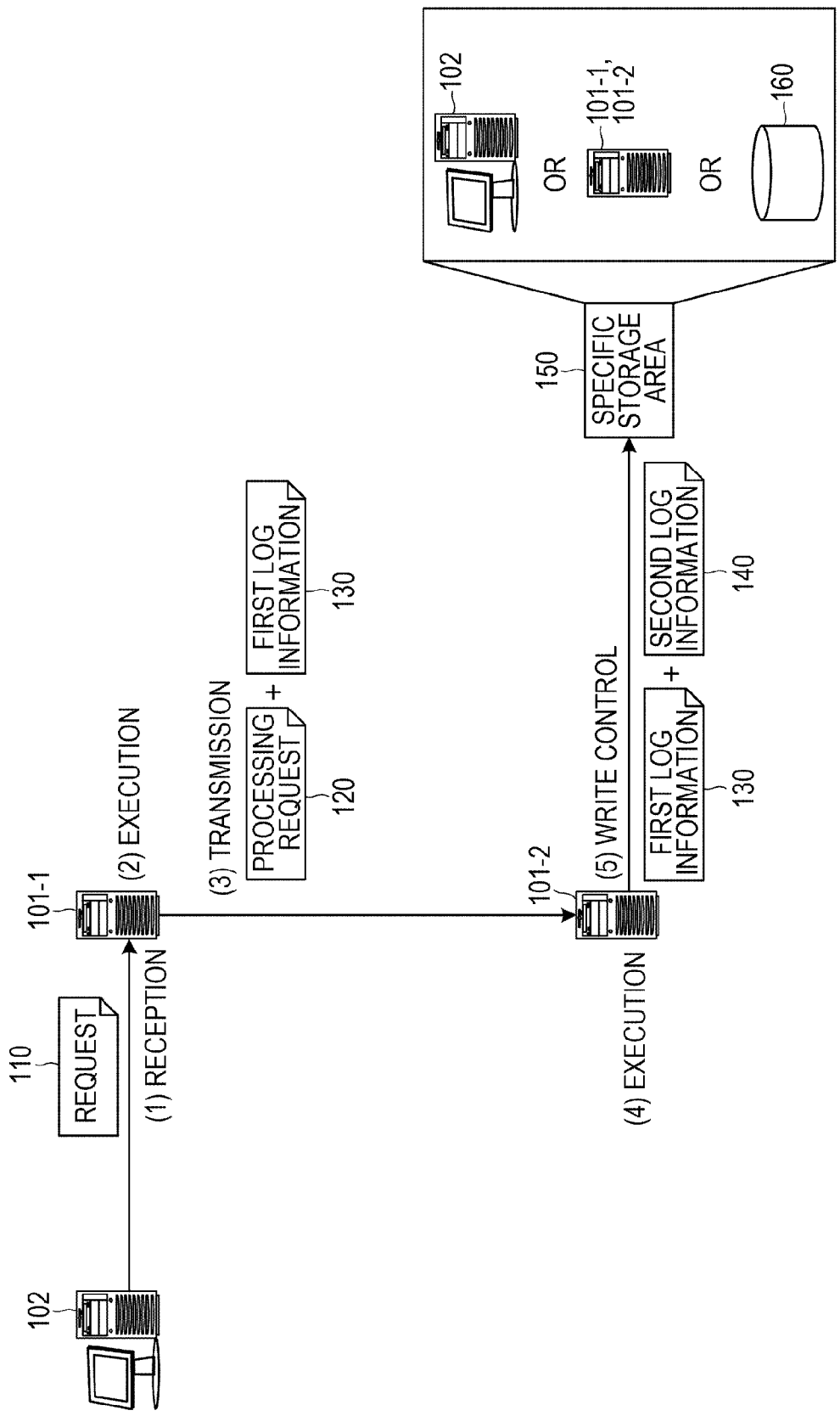
FIG. 1 is a schematic diagram illustrating an example of a log-collection assistance method, according to an embodiment.

FIG. 1 is a schematic diagram illustrating an example of a log-collection assistance method, according to an embodiment. In FIG. 1, servers 101 (servers 101-1 and 101-2 in the example of FIG. 1) are computers that receive, from a client apparatus 102, a request 110 for requesting execution of a process. The server 101 executes the process corresponding to the received request 110. The server 101 also outputs a log corresponding to the executed process. The server 101 also transmits, to another one of the servers 101, a processing request 120 for requesting execution of a process deriving from the executed process.

The client apparatus 102 is a computer that transmits the request 110 for requesting execution of the process to the server 101. The client apparatus 102 receives, from the server 101, a response including a processing result of the process corresponding to the transmitted request 110.

When log data regarding a series of processes executed by the multiple servers 101 is collected, for example, a processing channel in this system is identified with respect to the series of processes. In a system including multiple servers 101, such as in a cloud system, the servers 101 to which a series of processes is distributed is flexibly varied according to the processing capabilities and the load states of the respective servers 101 so that the servers 101 execute the distributed processes. Thus, it is generally difficult to identify a processing channel for the series of processes.

Accordingly, in an embodiment, the log data outputted from the servers 101 that execute the series of processes deriving from the request 110 transmitted from the client apparatus 102 are inherited from one server to another as the series of processes is executed. With this arrangement, the log data may eventually be stored in a specific storage area for the client apparatus 102 and the log data for each client apparatus 102 may be collected with efficiency.

An example of a log-collection assistance method according to an embodiment will be described below in conjunction with an example of a case in which a request 110 is transmitted from the client apparatus 102 to the server 101-1.

(1) The server 101-1 receives the request 110 from the client apparatus 102. The request 110 is, for example, an execution request for initiating execution of a series of processes to be executed by the multiple servers 101.

(2) The server 101-1 executes a process corresponding to the received request 110. The server 101-1 generates a processing request 120 and first log information 130. The processing request 120 is a request for requesting the server 101-2 to execute a process deriving from the executed process. The first log information 130 includes log data indicating an execution history of the process executed by the server 101-1.

(3) The server 101-1 transmits the generated processing request 120 and first log information 130 to the server 101-2.

(4) The server 101-2 receives the processing request 120 and the first log information 130 from the server 101-1. The server 101-2 executes a process corresponding to the received processing request 120. The server 101-2 also generates second log information 140 containing log data indicating an execution history of the process executed by the server 101-2.

(5) The server 101-2 controls writing of the first log information 130 and the second log information 140 into a specific storage area 150. The specific storage area 150 is a storage area provided in association with the client apparatus 102. Of all the pieces of log data outputted from the servers 101 (e.g., the servers 101-1 and 101-2), log data relevant to the client apparatus 102 is stored in the specific storage area 150.

The specific storage area 150 may be implemented by, for example, using any of storage areas of the servers 101 and the client apparatus 102. The specific storage area 150 may also be implemented by using any of storage areas in storage devices 160 that is accessible from the servers 101.

For example, when other computer different from the server 101-2 has the specific storage area 150, the server 101-2 transmits, to the other computer, an instruction for writing the first log information 130 and the second log information 140 into the specific storage area 150. The other computer may be, for example, the client apparatus 102 or the server 101-1.

When the server 101-2 has the specific storage area 150, the server 101-2 writes the first log information 130 and the second log information 140 into the specific storage area 150 of the server 101-2. When the storage device 160 has the specific storage area 150, the server 101-2 writes the first log information 130 and the second log information 140 to the specific storage area 150 in the storage device 160.

Thus, in the log-collection assistance method according to the embodiment, pieces of log data outputted from the servers 101 upon execution of processes deriving from the request 110 transmitted from the client apparatus 102 may be aggregated and accumulated in the specific storage area 150.

In this way, since pieces of log data relevant to the specific client apparatus 102 are stored together in the specific storage area 150, the pieces of log data relevant to the specific client apparatus 102 may be collected together from the specific storage area 150 associated with the specific client apparatus 102. This allows a workload needed for log collection to be reduced and allows only logs relevant to the specific client apparatus 102 to be collected during the log collection, thereby reducing the amount of log data collected.

In addition, the pieces of log data relevant to the specific client apparatus 102 may be stored together in the specific storage area 150 for each series of processes deriving from the request 110. As a result, the pieces of log data relevant to the series of processes deriving from the specific request 110 transmitted from the client apparatus 102 may be collected together from the specific storage area 150 provided in association with the specific client apparatus 102. This allows a workload needed for log collection to be reduced and allows only pieces of log data relevant to the series of processes deriving from the request 110 transmitted from the specific client apparatus 102, to be collected, thereby reducing the amount of log data collected.

(A Configuration Example of Log Collection System)

Figure 2:
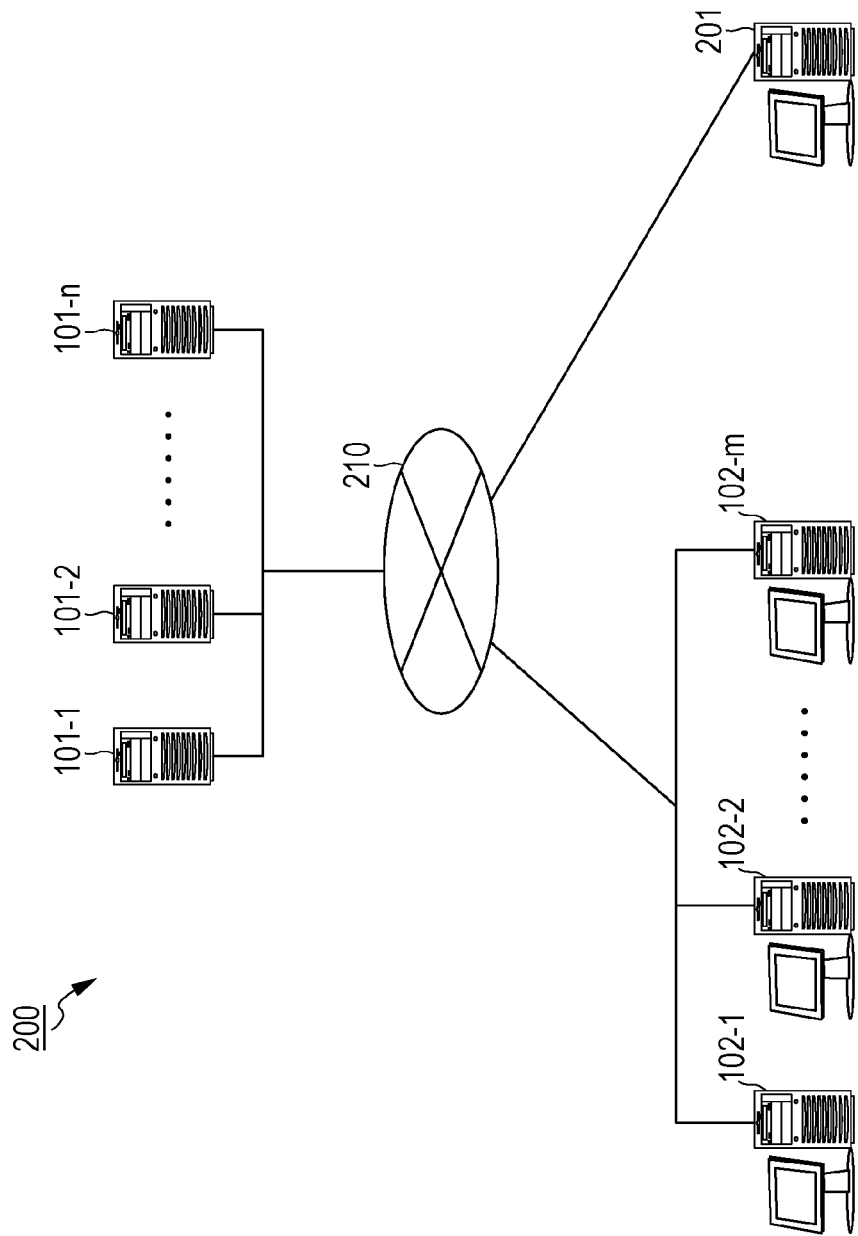
FIG. 2 is a diagram illustrating a configuration example of a log collection system, according to an embodiment.

FIG. 2 is a diagram illustrating a configuration example of a log collection system, according to an embodiment. In FIG. 2, a log collection system 200 includes servers 101-1 to 101-$n$, client apparatuses 102-1 to 102-$m$, and an information processing apparatus 201. In the log collection system 200, the servers 101-1 to 101-$n$, the client apparatuses 102-1 to 102-$m$, and the information processing apparatus 201 are connected through a wired or wireless network 210. Examples of the network 210 include a LAN (local area network), a WAN (wide area network), and the Internet.

Hereinafter, an arbitrary one of the servers 101-1 to 101-*n* is referred to as a "server 101-*i*" (i=1, 2, . . . , n) and an arbitrary one of the client apparatuses 102-1 to 102-*m* is referred to as a "client apparatus 102-*j*" (j=1, 2, . . . , m).

The server 101-*i* is a computer that receives, from the client apparatus 102-*j* or another server 101-*k* (where k≠i, k=1, 2, . . . , n), a request for executing a process. The server 101-*i* executes the process in response to the received request. The server 101-*i* outputs log data indicating an execution history of the executed process. The server 101-*i* also transmits, to the other server 101-*k*, a request for executing a process deriving from the executed process. The servers 101-1 to 101-*n* may be a group of servers in cloud computing.

The client apparatus 102-*j* is a computer that transmits a request for executing a process to the server 101-*i*. Examples of types of the request include requests based on a SOAP (simple object access protocol), JMS (Java™ Message Service), FTP (file transfer protocol), and CORBA (common object request broker architecture). The client apparatus 102-*j* also receives, from the server 101-*i*, a response corresponding to the transmitted request. Examples of the client apparatus 102-*j* include a PC (personal computer) and a notebook PC used by a user of the cloud computing.

The information processing apparatus 201 is a computer that collects pieces of log data outputted from the respective servers 101. The log data to be collected may be, for example, pieces of log data outputted from the respective servers 101 upon execution of a series of processes deriving from a request transmitted from the client apparatus 102. For example, the information processing apparatus 201 collects, from the specific storage area 150 (see FIG. 1) associated with the client apparatus 102-*j* for which pieces of log data are to be collected, pieces of log data relevant to the client apparatus 102-*j*. Examples of the information processing apparatus 201 include a PC and a notebook PC used by an administrator of the log collection system 200.

(An Example of a Hardware Configuration of a Computer)

Next, an exemplary hardware configuration of a computer (used as the servers 101-1 to 101-*n*, the client apparatus 102-1 to 102-*m*, and the information processing apparatus 201) according to the embodiment illustrated in FIG. 2 will be described with reference to FIG. 3.

Figure 3:
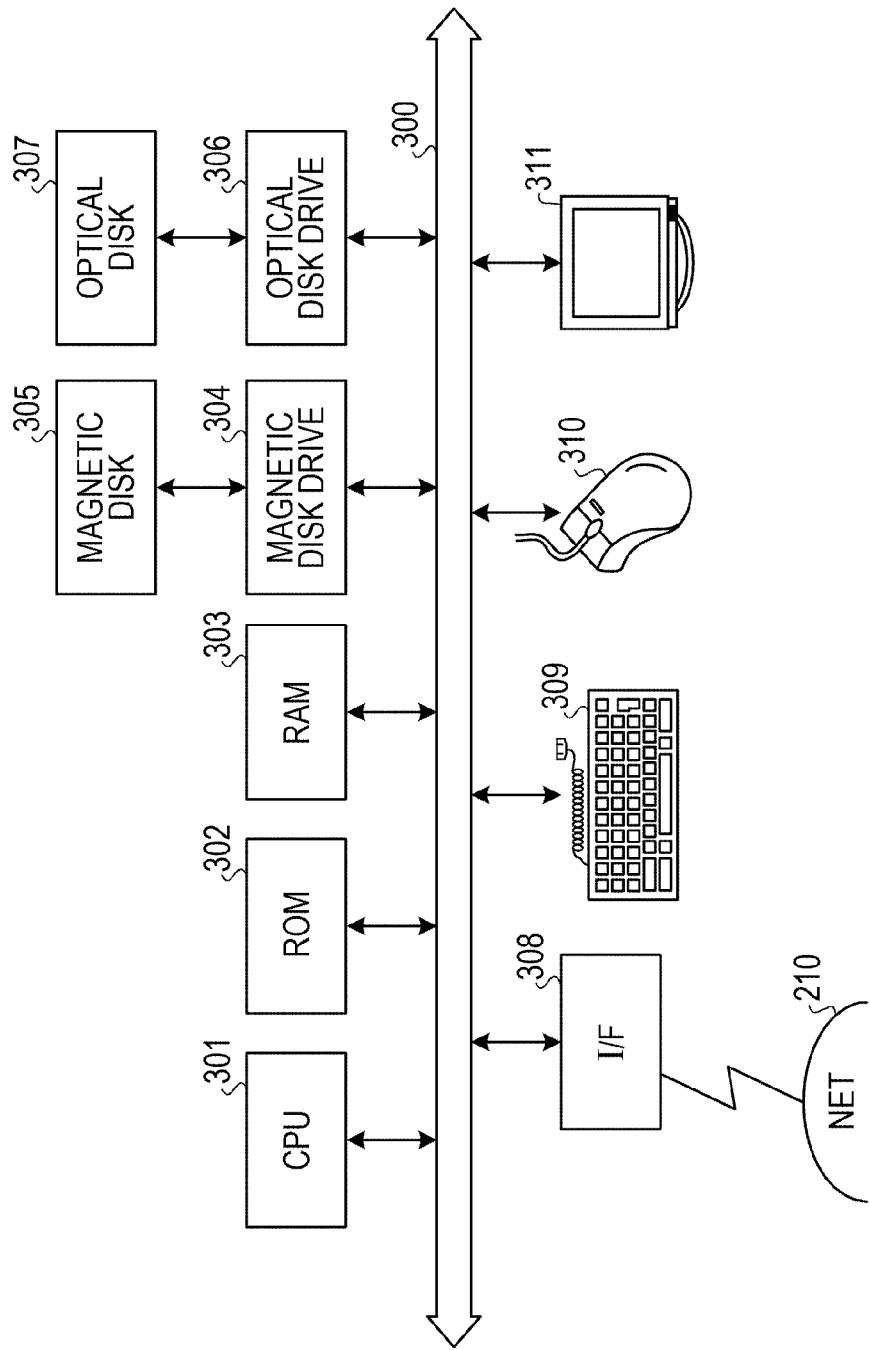
FIG. 3 is a diagram illustrating an example of a hardware configuration of a computer, according to an embodiment.

FIG. 3 is a diagram illustrating an example of a hardware configuration of a computer, according to an embodiment. As illustrated in FIG. 3, the computer includes a CPU (central processing unit) 301, a ROM (read only memory) 302, a RAM (random access memory) 303, a magnetic disk drive 304, a magnetic disk 305, an optical disk drive 306, an optical disk 307, an interface (I/F) 308, a keyboard 309, a mouse 310, and a display 311. The above mentioned configuration elements are interconnected through a bus 300.

The CPU 301 controls the overall computer. Programs, such as a boot program, are stored in the ROM 302. The RAM 303 may be used as a work area for the CPU 301.

Under the control of the CPU 301, the magnetic disk drive 304 controls writing/reading of data to/from the magnetic disk 305. Data written under the control of the magnetic disk drive 304 is stored on the magnetic disk 305.

Under the control of the CPU 301, the optical disk drive 306 controls writing/reading of data to/from the optical disk 307. Data written under the control of the optical disk drive 306 is stored on the optical disk 307 and also the computer reads data stored on the optical disk 307.

The interface 308 is connected with the network 210 through a communications line and is connected with an external apparatus through the network 210. The interface 308 interfaces between the network 210 and the internal elements to control output/input of data to/from the external apparatus. The interface 308 may be implemented by, for example, using a modem or a LAN adapter.

The keyboard 309 is used to input data and has keys for inputting characters, numerals, various instructions, and so on. The keyboard 309 may also be implemented by using a touch-panel input pad, a numerical keypad, or the like. The mouse 310 may be used to move a cursor, select a range, move a window, or change the size of the window. Any pointing device having functions similar to those described above may also be used. Examples include a trackball and a joystick.

The display 311 displays, for example, the cursor, icons, toolboxes, as well as documents, images, and data of function information and so on. Examples of the display 311 include a CRT (cathode ray tube) display, a TFT (thin film transistor) liquid crystal display, and a plasma display.

The hardware configuration of the computer illustrated in FIG. 3 is one example, and for example, the computer used as the server 101-*i* may or may not include the optical disk drive 306, the optical disk 307, the keyboard 309, the mouse 310, and the display 311. The computer used as the client apparatus 102 or the information processing apparatus 201 may include, for example, a scanner and/or a printer.

(A Configuration Example of a Client Apparatus)

Figure 4:
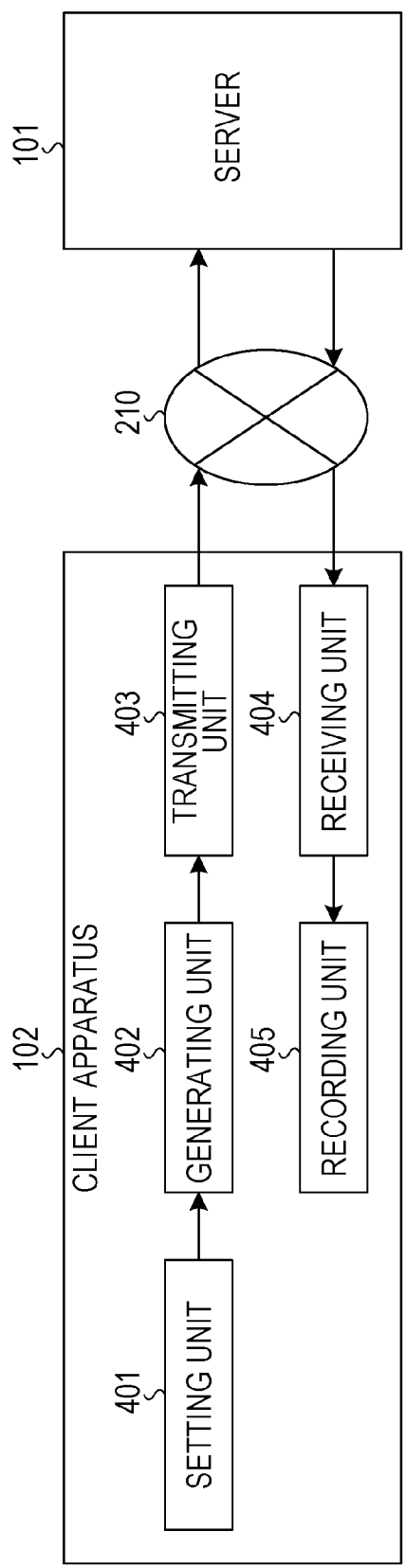
FIG. 4 is a diagram illustrating a configuration example of a client apparatus, according to an embodiment.

FIG. 4 is a diagram illustrating a configuration example of a client apparatus, according to an embodiment. The client apparatus 102-*j* includes a setting unit 401, a generating unit 402, a transmitting unit 403, a receiving unit 404, and a recording unit 405. These units 401 to 405 provide functions as a control unit and may realize the functions, for example, by causing the CPU 301 to execute a program stored in a storage device, such as the ROM 302, the RAM 303, the magnetic disk 305, or the optical disk 307, using the interface 308 illustrated in FIG. 3. Processing results of the functional units 401 to 405 are stored in a storage device, such as the RAM 303, the magnetic disk 305, or the optical disk 307.

The setting unit 401 has a function for setting a log level to be outputted. The "log level to be outputted" used in this case refers to a set of log classes to be outputted from the server 101-*i*. For example, a set of log classes to be outputted from the server 101-*i* may include an error log, a warning log, a detail log, a debug log, and a combination thereof. For example, when the user of the client apparatus 102-*j* or the administrator of the information processing apparatus 201 inputs a log level to be outputted, the setting unit 401 sets a definition file (e.g., a definition file 500 which will be described later and illustrated in FIG. 5).

In this case, a log level to be outputted is input by, for example, the user of the client apparatus 102-*j* through operation of the keyboard 309 and/or the mouse 310. The log level to be outputted may also be input by receiving a log class from the information processing apparatus 201 to which the log level is input by the administrator of the information processing apparatus 201. This allows the setting unit 401 to set a log level to be outputted from the server 101-*i*, and to notify the server 101-*i* of the log level to be outputted from the server 101-*i* when issuing a log collection request to the server 101-*i*.

Now, a specific example of a definition file in which the log level to be outputted is set by the setting unit 401 will be described with reference to FIG. 5.

Figure 5:
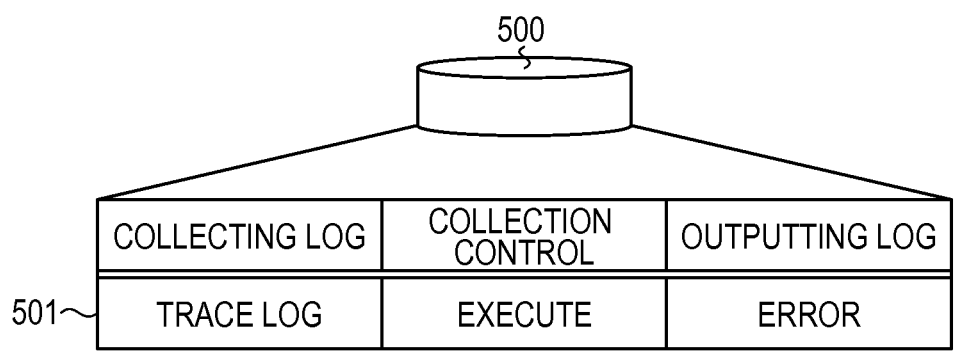
FIG. 5 is a diagram illustrating an example of a log-collection definition file, according to an embodiment.

FIG. 5 is a diagram illustrating an example of a log-collection definition file, according to an embodiment. FIG. 5 illustrates a case in which the client apparatus 102-*j* creates a log-collection definition file that is common to all requests generated by the client apparatuses 102. A log-collection definition file 500 stores one or more records each including a "collecting log" field, a "collection control" field, and a "outputting log" field. The definition file may be set by the user of the client apparatus 102-*j* or the administrator of the information processing apparatus 201.

In the "collecting log" field, information identifying a type of log data to be collected by the server 101-*i* is stored. For example, information identifying a trace log or a sequence log is set in the "collecting log" field as an identifier identifying a type of log data to be collected by the server 101-*i*. In the "collection control" field, information indicating whether or not the server 101-*i* is to "perform" log collection is set. In the "outputting log" field, information identifying a log level to be outputted from the server 101-*i* is set. The log level indicates a set of log classes that are extracted from the log data identified by the "collecting log" field and are outputted from a server 101-*i*. For example, in the "outputting log" field, information identifying an error log, a warning log, a detail log, a debug bug, or a combination thereof may be set as a log level identifying a set of log classes to be extracted from the collected log data.

For example, a record 501 illustrated in FIG. 5 indicates that the server 101 is to "perform" log collection, the type of log data to be collected by the server 101 is a "trace log", and the log level to be outputted from the server 101 (or a set of log classes to be extracted from the log data "trace log" collected by the server 101) is an "error log".

Although a case in which the client apparatus 102-*j* creates a single log-collection definition file 500 that is common to all the requests has been described above, the client apparatus 102-*j* may create multiple log-collection definition files 500. For example, the client apparatus 102-*j* may create log-collection definition files 500 that are different for respective types of request. The client apparatus 102-*j* may also create a table obtained by adding a "request type" field to the log-collection definition file 500 so that each record is associated with the type of request. This arrangement allows different types of the logs to be collected for respective types of request. Further, this arrangement allows log-data collection in which log data is collected for a specific type of request and not collected for a specific type of request.

Referring back to FIG. 4, the generating unit 402 has a function for generating request data. Here, the "request data" used in this case is data that includes a request main body for requesting execution of a process and a log-data-reporting request. The log-data-reporting request includes a type of log data to be collected by the server 101-*i* in association with a log level to be outputted, and requests the server 101-*i* to report the collected log data. For example, the generating unit 402 refers to the log-collection definition file 500 to generate a log-data reporting request that includes information on the type of log data to be collected by the server 101-*i* and a log level to be outputted.

The generating unit 402 then generates request data containing the generated log-data reporting request. In this way, the generating unit 402 is able to generate request data to be transmitted to the server 101-*i*. An example of the data structure of the request data generated by the generating unit 402 will be described with reference to FIG. 6.

Figure 6:
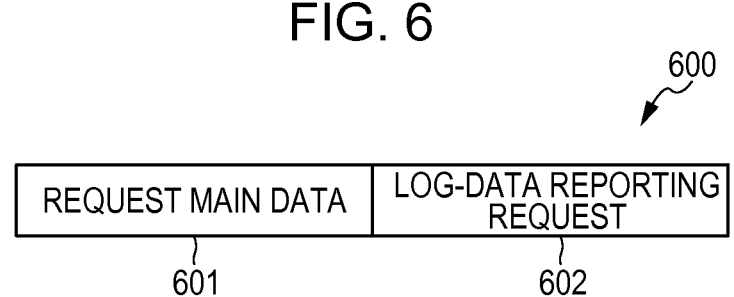
FIG. 6 is a diagram illustrating an example of request data, according to an embodiment.

FIG. 6 is a diagram illustrating an example of request data, according to an embodiment. As illustrated in FIG. 6, request data 600 includes request main data 601 and a log-data reporting request 602. The request main data 601 is data for requesting execution of a process. The log-data reporting request 602 is data that requests the server 101-*i* to report collected log data to the client apparatus 102-*j*, where the log-data reporting request 602 contains a type of log data to be collected by the server 101-*i* and a log level to be outputted from the server 101-*i*. Next, an example of the log-data reporting request 602 illustrated in FIG. 6 will be described with reference to FIGS. 7 and 8.

FIG. 7 is a diagram illustrating an example of a log-data reporting request, according to an embodiment. In the log-data reporting request 602 illustrated in FIG. 7, a portion denoted by reference numeral 710 is used for indicating an IP (internet protocol) address of the client apparatus 102-*j*. In this case, the portion denoted by reference numeral 710 states an IP address "192.168.10.1".

A portion denoted by reference numeral 721 is used for indicating a type of log data to be collected by the server 101-*i*. In this case, the portion denoted by reference numeral 721 designates "tracelog", as a type of log data to be collected by the server 101-*i*, meaning a trace log. The generating unit 402 generates information for the portion denoted by reference numeral 721, by referring to the "collecting log" field in the log-collection definition file 500.

A portion denoted by reference numeral 722 is used for indicating whether or not the server 101-*i* is to perform log collection. In this case, the portion denoted by reference numeral 722 states "yes" to indicate that the server 101-*i* is to perform log collection. The generating unit 402 generates information for the portion denoted by reference numeral 722, by referring to the "collection control" field in the definition file 500.

A portion denoted by reference numeral 723 is used for indicating a log level that is to be extracted from the log data collected by the server 101-*i* and to be outputted from the server 101-*i*. Here, "a log level" means a set of log classes to be extracted from the collected log data. In this case, the portion denoted by reference numeral 723 designates "debuglog", as a log level to be outputted from the server 101-*i*, meaning a debug log. The generating unit 402 generates information for the portion denoted by reference numeral 723, by referring to the "outputting log" field in the log-collection definition file 500.

It is also possible to define that, when the portion denoted by reference numeral 723 designates "a debug log", the log level to be outputted is a set of log classes including an error log, a warning log, and a detail log in addition to the debug log. It is also possible to define that, when the portion denoted by reference numeral 723 designates "a detail log", the log level to be outputted is a set of log classes including an error log and a warning log in addition to a detail log. It is also possible to define that, when the portion denoted by reference numeral 723 designates "an error log", the log level to be outputted is a set of log classes including only the error log, or it is also possible to define that, when the portion denoted by reference numeral 723 designates "a warning log", the log level to be outputted is a set of log classes including an error log in addition to the warning log.

Portions denoted by reference numerals 731, 732, and 733 are used in a manner similar to those denoted by reference numerals 721, 722, and 733, respectively. In this case, the portions denoted by reference numerals 731 to 733 indicate that the type of log data to be collected by the server 101-*i* is "a sequence log", and the log level that is to be extracted from the collected sequence log data and to be outputted from the server 1-1-*i* is "a debug log".

FIG. 8 is a diagram illustrating an example of a log-data reporting request, according to an embodiment. In the log-data reporting request 602 illustrated in FIG. 8, a portion denoted by reference numeral 810 indicates the IP address of the client apparatus 102-*j*, similarly to the portion denoted by reference numeral 710. In this case, the portion denoted by reference numeral 810 designates an IP address "192.168.10.2".

Portions denoted by reference numerals 821 and 831 indicate information that is similar to the information indicated at the portion denoted by reference numeral 721. Portions denoted by reference numerals 822 and 832 indicate information that is similar to the information indicated at the portion denoted by reference numeral 722. Portions denoted by reference numerals 823 and 833 indicate information that is similar to the information indicated at the portion denoted by reference numeral 723.

In the example of FIG. 8, the portions denoted by reference numerals 821 to 823 indicate that the type of log data to be collected by the server 101-*i* is a trace log and the log level that is to be extracted from the collected trace log and to be outputted is an error log. The portions denoted by reference numerals 831 to 833 also indicate that the type of log data to be collected by the server 101-*i* is a sequence log and the log level that is to be extracted from the collected sequence log and to be outputted is an error log.

Referring back to FIG. 4, the transmitting unit 403 has a function for transmitting the request data 600 to the server 101-*i*. For example, the transmitting unit 403 transmits, to the server 101-*i*, the request data 600 including the log-data reporting request 602 illustrated in FIG. 7 or 8. This allows the transmitting unit 403 to transmit the request data 600 to the server 101-*i* and to cause the server 101-*i* to execute a series of processes indicated by the request main data 601 included in the request data 600.

The receiving unit 404 has a function for receiving response data from the server 101-*i*. The "response data" used in this case is data including response main data including a processing result of a series of processes requested by the request main data 601 included in the request data 600. Here, the "response data" is data including aggregated log data outputted from the servers 101-*i* that executed a series of processes requested by the request main data 601 included in the request data 600.

For example, the receiving unit 404 receives the response data that was transmitted from the server 101-*i* as a result of transmission of the request data 600. This allows the receiving unit 404 to receive, from the server 101-*i*, the processing result of the series of processes that was requested to execute by the client apparatus 102-*j* and the log data indicating an execution history of the series of processes. An example of the response data will be described later with reference to FIG. 14. An example of the log data contained in the response data will be described later with reference to FIGS. 15 and 16.

The recording unit 405 has a function for recording the log data. For example, when the response data received by the receiving unit 404 contains log data, the recording unit 405 extracts the log data from the response data and records the extracted log data in the specific storage area 150. Thus, the recording unit 405 is able to record the log data relevant to the client apparatus 102-*j* in the storage area 150 provided for the client apparatus 102-*j*.

(A Configuration Example of a Server)

FIG. 9 is a diagram illustrating a configuration example of a server, according to an embodiment. The server 101-*i* includes a receiving unit 901, an identifying unit 902, an executing unit 903, an extracting unit 904, a generating unit 905, a write controlling unit 906, and a transmitting unit 907. These units 901 to 907 provide functions as a control unit and may realize the functions, for example, by causing the CPU 301 to execute programs stored in a storage device, such as the ROM 302, the RAM 303, the magnetic disk 305, or the optical disk 307, using the interface 308 illustrated in FIG. 3. Processing results of the functional units 901 to 907 are stored in a storage device, such as the RAM 303, the magnetic disk 305, or the optical disk 307.

The receiving unit 901 has a function for receiving a request from the client apparatus 102-*j*. The term "request" used in this case refers to the request main data 601 contained in the above-described request data 600. For example, the receiving unit 901 receives, from the client apparatus 102-*j*, the request data 600 including the request main data 601 and the log-data reporting request 602 as illustrated in FIG. 7 or 8. This allows the receiving unit 901 to receive a request that acts as a trigger for initiating execution of a series of processes indicated by the request main data 601 transmitted from the client apparatus 102-*j*.

The receiving unit 901 has a function for receiving, from another server apparatus in the system, a request for executing a second process in the series of processes, where the request contains first log information outputted upon execution of a first process in the series of processes. It is assumed, in the description below, that the term "server apparatus" corresponds to the server 101-*i*, and the term "another/other server apparatus" corresponds to the server 101-*k* where k is different from i. The expression "series of processes" refer to processes executed in response to the request from the client apparatus 102-*j*. The term "first process" is, of the series of processes executed according to the request main data 601, a process that is previously executed by the other server apparatus 101-*k*. The term "first log information" indicates log data outputted from the other server 101-*k* that executed the first process. The term "second process" is, of the series of processes, a process to be executed next to the first process. The term "request for executing the second process" indicates the request main data generated by the other server 101-*k* that executed the first process, which will be described below with reference to FIG. 12.

The receiving unit 901 receives, from the other server 101-*k*, request data containing log data as described below with reference to FIG. 12 or 13. This allows the receiving unit 901 to receive a request that acts a trigger for initiating execution of any one of the series of processes from the other server 101-*k*.

The identifying unit 902 has a function for identifying a target server 101-*i* that executes each process of the series of processes to be executed in response to a request from the client apparatus 102-*j*. The "target server 101-*i* that executes each process of the series of processes" is, for example, the server 101-*i* having an application used for executing the each process of the series of processes.

For example, when the receiving unit 901 receives the request data 600 from the client apparatus 102-*j*, the identifying unit 902 identifies the server 101-*i* that is able to execute a process requested by the request main data 601 contained in the request data 600. In this case, when multiple servers 101 are able to execute the process, the identifying unit 902 may refer to processing capabilities or workloads of the multiple servers 101 so as to identify, of the multiple servers 101, the server 101-*i* that executes the process.

For example, the identifying unit 902 determines whether or not a series of processes requested by the request data 600 is of synchronous type or of asynchronous type, and identifies the servers 101 that execute the series of processes. When the request data 600 contains information indicating whether the series of processes is of synchronous type or of asynchronous type, the identifying unit 902 may refer to the request data 600 to determine whether or not the series of processes is of synchronous type or of asynchronous type. When the request data 600 includes an identifier thereof, the identifying unit 902 may refer to a table in which the identifier is associated with information indicating a synchronous process or an asynchronous process, to determine whether or not the series of processes is of synchronous type or of asynchronous type. Thus, the identifying unit 902 may identify the server 101-*i* that is to execute each process of the series of processes.

The synchronous processes are processes that are executed between the servers 101 having a parent-and-child relationship. In the synchronous processes, the parent server requests the child server to execute a process and then receives a processing result from the child server. In the synchronous processes, the parent server aggregates processing results of the series of processes and transmits the aggregated processing results to the client apparatus 102-*j*.

The asynchronous processes are processes that are executed between the independent servers 101. In the asynchronous processes, when a server 101-*i* has completed execution of a process, the server 101-*i* requests another server 101-*k* to execute a next process, by transmitting the processing result of the server 101-*i*. In the asynchronous processes, a server 101-*i* that has executed the last process within the series of processes transmits a processing result of the series of processes to the client apparatus 102-*j*.

Now, with reference to FIGS. 10 and 11, one example of the series of processes executed according to the request main data 601 included in the request data 600 transmitted from the client apparatus 102-*j* will be described with respect to each of the cases of the synchronous and asynchronous processes.

<An Example of a Series of Synchronous Processes>

An example of a series of synchronous processes will first be described with reference to FIG. 10.

Figure 10:
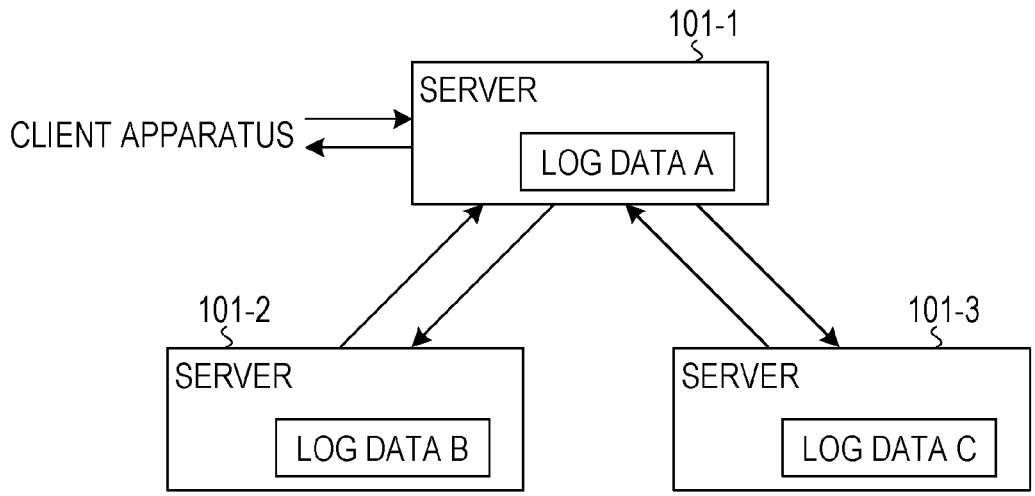
FIG. 10 is a diagram illustrating an example of a series of synchronous processes, according to an embodiment.

FIG. 10 is a diagram illustrating an example of a series of synchronous processes, according to an embodiment. As illustrated in FIG. 10, upon receiving a request data 600 from a client apparatus 102-*j*, a server 101-1 determines that the server 101-1 is a parent server and executes a first process in the series of synchronous processes requested by the request data 600. The server 101-1 then identifies a child server that executes a second process to be executed next to the executed first process and transmits, to the identified child server(s), request data for requesting execution of the next process to be executed.

In this case, upon identifying a child server, the server 101-1 writes, in the request data, information identifying the child server. The server 101-1 then receives response data including a processing result of the child server. Upon completing the execution of all the series of synchronous processes, the server 101-1 aggregates pieces of response data received from the child servers into a piece of response data and transmits the aggregated piece of response data to the client apparatus 102-*j*.

For example, the server 101-1 identifies a server 101-2 as a child server that executes a second process next to the first process executed by the server 101-1 and transmits, to the identified server 101-2, request data that contains a child-server identifier information identifying the child server and requests execution of the second process. Upon receiving the request date, based on the child-server identifier information contained in the received request data, the server 101-2 determines that the server 101-2 is a child server. The server 101-2 then executes the second process and transmits response data including a processing result of the server 101-2 to the server 101-1.

The server 101-1 receives the response data including the processing result from the server 101-2. The server 101-1 identifies a server 101-3 as a child server that executes a third process next to the second process executed by the server 101-2 and transmits, to the identified server 101-3, request data that includes child-server identifier information identifying the child server and requests execution of the third process. Upon receiving the request date, based on the child-server identifier information included in the received request data, the server 101-3 determines that the server 101-3 is a child server. The server 101-3 then executes the third process and transmits response data including a processing result of the server 101-3 to the server 101-1.

The server 101-1 receives the response data including the processing result from the server 101-3. When the series of synchronous processes is completed, the server 101-1 transmits the processing result of the server 101-1 and the processing results received from the servers 101-2 and 101-3, together to the client apparatus 102-*j*.

Further, the parent server may be configured to transmit multiple requests for executing processes, simultaneously, to multiple child servers. The parent server may also transmit a request for executing a process to the same child server multiple times.

<An Example of a Series of Asynchronous Processes>

Next, an example of a series of asynchronous processes will be described with reference to FIG. 11.

Figure 11:
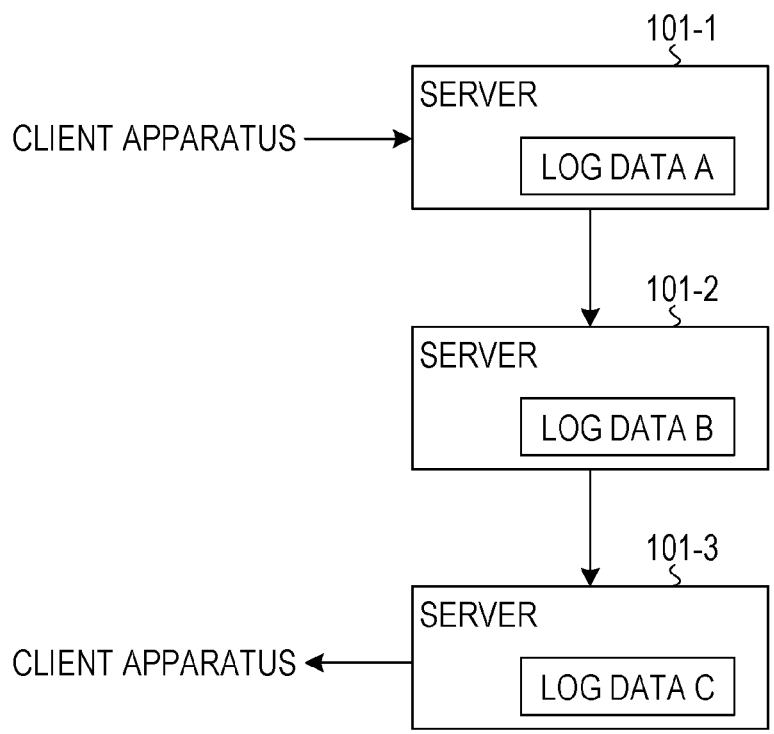
FIG. 11 is a diagram illustrating an example of a series of asynchronous processes, according to an embodiment.

FIG. 11 is a diagram illustrating an example of a series of asynchronous processes, according to an embodiment. As illustrated in FIG. 11, upon receiving a request data 600 from a client apparatus 102-*j*, a server 101-1 executes a first process in the series of asynchronous processes requested by the request data 600. At this point, the server 101-1 identifies another server 101-2 that executes, of the series of asynchronous processes, a second process that has derived from the executed first process. The server 101-1 then transmits, to the identified server 101-2, request data for requesting execution of the second process, together with the processing result of the server 101-1. In this case, information identifying the identified server 101-2 is stored in the request data transmitted from the server 101-1.

The server 101-2 receives the request data from the server 101-1 and then executes the requested second process. At this point, the server 101-2 identifies another server 101-3 that executes, of the series of asynchronous processes, a third process that has derived from the executed second process. The server 101-2 then transmits, to the identified server 101-3, request data for requesting execution of the third process, together with a processing result of the server 101-1 and a processing result of the local server 101-2. In this case, information identifying the identified server 101-3 is stored in the request data transmitted from the server 101-2.

Upon receiving the request data from the server 101-2, the server 101-3 executes the requested third process. In this case, the server 101-3 determines that the server 101-3 is a server 101-*i* that executes the last process of the series of asynchronous processes. The server 101-3 then transmits the processing results of the server 101-1, the server 101-2, and the server 101-3 together to the client apparatus **102-*j*. The determination as to whether or not the server 101-*i* is the server 101-*i* that executes the last process may be made based on information that is contained in the request data 600 and identifies the server 101** that executes an asynchronous process.

Referring back to FIG. 9, the executing unit 903 has a function for executing a first process when the receiving unit 901 receives a request and outputting first log information indicating an execution history of the first process. For example, the executing unit 903 executes a first process corresponding to the request main data 601 contained in the request data 600 that was received from the client apparatus **102-*j* by the receiving unit 901. Upon executing the first process, the executing unit 903 generates log data including first log information indicating an execution history of the executed first process. The executing unit 903 then outputs the generated log data. In this way, the executing unit 903** is able to execute a series of processes, generate log data including log information indicating an execution history of the executed process, and output the generated log data.

The executing unit 903 also has a function for executing a second process when the receiving unit 901 receives a request for executing the second process and outputting second log information indicating an execution history of the second process. For example, the executing unit 903 executes, of the series of processes requested by the request main data 601, a process designated by the request main data contained in a request data that has been received from the other server **101-*k* by the receiving unit 901. Upon executing the process, the executing unit 903 generates log data including log information indicating an execution history of the executed process. The executing unit 903 then outputs the generated log data including the log information indicating an execution history of the executed process. In this way, the executing unit 903** is able to execute relevant part of the series of processes, generate log data including log information indicating an execution history of the executed process, and output the generated log data.

The extracting unit 904 has a function for extracting, when the receiving unit 901 receives a request for executing the second process, log information having a log level designated by the second request, from log data that is collected by the executing unit 903 when the second process is executed. Here, "a log level" means a set of log classes to be extracted from the log data collected by the executing unit 903. For example, the extracting unit 904 extracts, from the log data collected when the executing unit 903 executes the second process, log information having a log level that is determined by referring to the log-data reporting request 602 contained in the request data 600.

For example, by referring to the log-data reporting request 602 illustrated in FIG. 7, the extracting unit 904 may extract log information having a log level "a debug log" from the trace log and the sequence log that are collected when the executing unit 903 executes a process. For example, by referring to the log-data reporting request 602 illustrated in FIG. 8, the extracting unit 904 may extract log information having a log level "an error log" from the trace log and the sequence log that are collected when the executing unit 903 executes a process. That is, the extracting unit 904 may extract log information having a log level for which the collection request was issued by the user of the client apparatus **102-*j* or the administrator of the information processing apparatus 201**, and may generate log data containing the extracted log information.

It is also possible to define that, when "a debug log" is designated as a log level (as defined in the log-data reporting request 602 illustrated in FIG. 7), a set of log classes including an error log, a warning log, and a detail log in addition to a debug log are to be extracted from the collected log data. In this case, the extracting unit 904 extracts, from the collected trace log data and the collected sequence log data, not only the debug log but also the error log, the warning log, and the detail log.

The generating unit 905 of a server **101-*i* has a function for generating request data for another server 101-*k*. For example, the generating unit 905 of the server 101-*i* determines whether or not, of the series of processes deriving from the request main data 601, a process allocated to the server 101-*i* is the last process to be executed within the series of processes. When the process allocated to the server 101-*i* is not the last process to be executed within the series of processes, the generating unit 905 generates request data for the other server 101-*k***.

That is, the generating unit 905 is able to generate request data for requesting execution of, of the series of processes, a process to be executed next to the process executed by the server **101-*i*. Now, an example of the data structure of the request data generated by the generating unit 905 will be described with reference to FIGS. 12 and 13 in conjunction with an example of the series of asynchronous processes illustrated in FIG. 11**.

Figure 12:
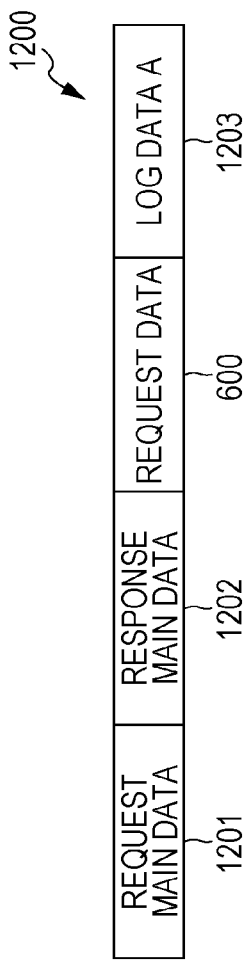
FIG. 12 is a diagram illustrating an example of request data, according to an embodiment.

FIG. 12 is a diagram illustrating an example of request data, according to an embodiment. As illustrated in FIG. 12, the server 101-1 generates request data 1200, which is obtained by merging request main data 1201, response main data 1202, and log data A 1203 with the request data 600 received from the client apparatus **102-*j*. Here, "merging" means generating a piece of data by combining multiple pieces of data. The request main data 1201 is data for requesting the server 101-2 to execute a process. The response main data indicates the processing result of the server 101-1. The log data A 1203 is log data outputted from the server 101-1. The server 101-1 transmits the generated request data 1200 to the server 101-2**.

Figure 13:
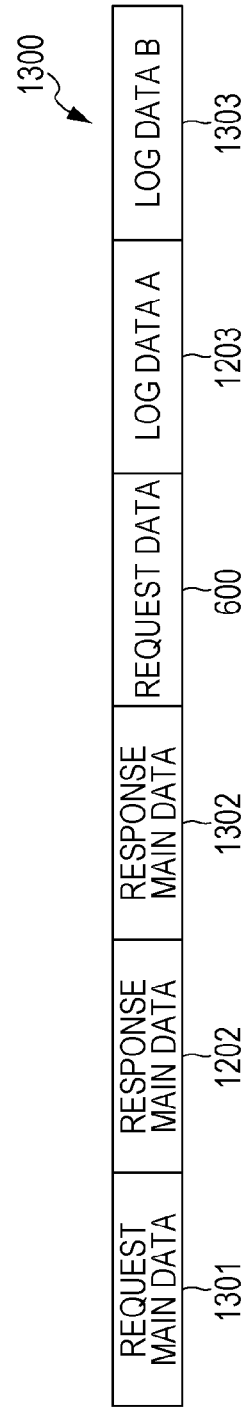
FIG. 13 is a diagram illustrating an example of request data, according to an embodiment.

FIG. 13 is a diagram illustrating an example of request data, according to an embodiment. Upon receiving the request data 1200 from the server 101-1, the server 101-2 merges request main data 1301, response main data 1302, and log data B 1303 with the received request data 1200, as illustrated in FIG. 13. As a result of the merging, the server 101-2 generates request data 1300. For example, the server 101-2 extracts the response main data 1202, the request data 600, and the log data A 1203 contained in the received request data 1200. The server 101-2 then merges the request main data 1301, the response main data 1302, and the log data B 1303, which are generated by the server 101-2, with the extracted data.

The request main data 1301 is data for requesting the server 101-3 to execute a process. The response main data 1302 indicates the processing result of the server 101-2. The log data B 1303 indicates log data outputted from the server 101-2. The server 101-2 transmits the generated request data 1300 to the server 101-3. As illustrated in FIGS. 12 and 13, a server **101-*i* aggregates the log data output from another server 101-*i* that has already executed the process and the log data outputted from the server 101-*i***.

Referring back to FIG. 9, the generating unit 905 has a function for generating response data for the client apparatus **102-*j***. For example, when the process allocated to the server 101-*i* is the last process to be executed, the generating unit 905 generates response data for the client apparatus 102-*j*. As described above, the response data is data containing the response main data representing the processing results outputted from the servers 101 that executed a series of processes requested by the request main data 601. As described above, the response data is data containing pieces of log data outputted from the servers 101 that executed a series of processes requested by the request main data 601.

In this way, the generating unit 905 of a server 101-*i* may generate response data to be transmitted to the client apparatus 102-*j* when the process executed by the server 101-*i* is the last process of the series of processes. Now, an example of the data structure of response data generated by the generating unit 905 will be described with reference to FIG. 14 in conjunction with an example of the series of asynchronous processes illustrated in FIG. 11.

Figure 14:
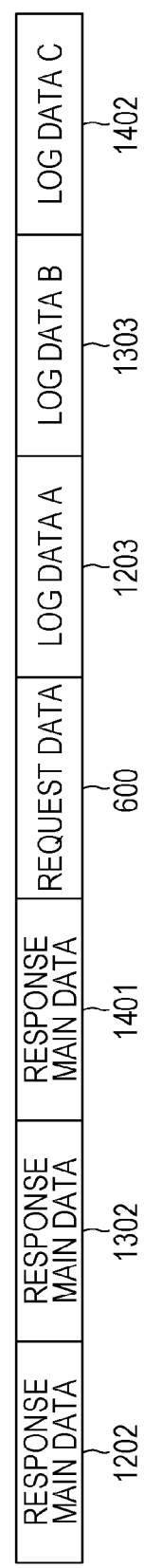
FIG. 14 is a diagram illustrating an example of response data, according to an embodiment.

FIG. 14 is a diagram illustrating an example of response data, according to an embodiment. Upon receiving the request data 1300 from the server 101-2, the server 101-3 generates response data 1400, which is obtained by merging response main data 1401 and log data C 1402 with the received request data 1300, as illustrated in FIG. 14.

For example, the server 101-3 extracts, from the received request data 1300, the response main data 1202 and 1302, the request data 600, the log data A 1203, and the log data B 1303. The server 101-3 then merges the response main data 1401 and the log data C 1402 generated by the server 101-3, with the extracted data. The response main data 1401 indicates the processing result of the server 101-3. The log data C 1402 is log data outputted from the server 101-3. The server 101-3 transmits the generated request data 1400 to the client apparatus 102-*j*.

As illustrated in FIG. 14, a server 101-*i* aggregates the log data outputted from other servers 101 that have already executed processes and the log data outputted from the server 101-*i*. Thus, log data may be stored in the specific storage area 150 for each the series of processes by storing log data for each the response data 1400. In addition, when the log data A 1203, the log data B 1303, and the log data C 1402 are merged together and arranged in order of generation, as illustrated in FIG. 14, it is possible to recognize the order of the servers 101 that executed the series of processes. This allows log data to be stored in the specific storage area 150 so that the order of execution of the series of processes is recognized.

With this arrangement, the administrator of the information processing apparatus 201 may refer to only the log data relevant to the series of processes and may recognize the order of execution of the series of processes, thereby making it easier to perform log analysis. The log data may also be accompanied by, for example, information that identifies the type of request. Examples of the information that identifies the type of request include a request name and a process ID identifying a series of processes that are derived from a request and to be executed. This allows the information processing apparatus 201 to extract, from among pieces of log data for the specific client apparatus 102, only log information having a specific log level. The information that identifies a log level is contained in, for example, the request data 600 transmitted from the client apparatus 102-*j* to the server 101-*i*.

Next, an example of log data contained in the response data 1400 illustrated in FIG. 14 will be described with reference to FIGS. 15 and 16.

FIG. 15 is a diagram illustrating an example of log data, according to an embodiment. In the log data illustrated in FIG. 15, a portion denoted by reference numeral 1510 indicates the IP address of the server 101-*i* that transmitted the response data 1400. In this case, the portion denoted by reference numeral 1510 indicates an IP address "192.168.58.4".

A portion denoted by reference numeral 1521 indicates a type of log data to be collected by the server 101-*i*. In this case, the portion denoted by reference numeral 1521 indicates "tracelog" meaning that the type of log data to be collected by the server 101-*i* is a trace log.

A portion denoted by reference numeral 1522 stores log information that is extracted from the log data collected by the server 101-*i*. In this case, the portion denoted by reference numeral 1522 stores a debug log data extracted from a trace log data collected by the server 101-*i*. For example, the portion denoted by reference numeral 1522 stores date and time "2011/06/28 11:42:35" when the log was generated, a process name "esistart" for which the log data was generated, and a log level "DEBUG". The portion denoted by reference numeral 1522 further stores a log ID "DEBUG99999" and log contents "xxxxx".

A portion denoted by reference numeral 1531 stores information that is similar to the information stored in the portion denoted by reference numeral 1521. A portion denoted by reference numeral 1532 stores information that is similar to the information stored in the portion denoted by reference numeral 1522. In this case, the portions denoted by reference numerals 1531 and 1532 stores the debug log extracted from the sequence log data collected by the server 101-*i*.

FIG. 16 is a diagram illustrating an example of log data, according to an embodiment. In the log-data illustrated in FIG. 16, a portion denoted by reference numeral 1610 indicates the IP address of the server 101-*i*, similarly to the portion denoted by reference numeral 1510. In this case, the portion denoted by reference numeral 1610 indicates the IP address "192.168.58.4".

Portions denoted by reference numerals 1621 and 1631 indicate information that is similar to the information indicated at the portion denoted by reference numeral 1521. Portions denoted by reference numerals 1622 and 1632 indicate information that is similar to the information indicated at the portion denoted by reference numeral 1522.

In this case, the portions indicated by reference numerals 1621 and 1622 indicate error log data that is extracted from trace log data collected by the server 101-*i*. The portions denoted by reference numerals 1631 and 1632 indicate error log data extracted from the sequence log data collected by the server 101-*i*.

Referring back to FIG. 9, the write controlling unit 906 has a function for controlling writing of the first log information and the second log information into the specific storage area 150 provided in association with the client apparatus 102-*j*. The second log information is log information that is outputted upon execution of the second process, that is, log information that is extracted, by the extracting unit 904, from the log data collected upon execution of the second process.

For example, upon receiving a request for processing a second process of the series of processes, the write controlling unit 906 determines whether or not the second process is the last process to be executed within the series of processes. Upon determining that the second process is the last process to be executed within the series of processes, the write controlling unit 906 transmits the first and second log information to the client apparatus 102-*j*. In this way, the write controlling unit 906 instructs the client apparatus 102-*j* to write the first and second log information to the specific storage area 150 provided for the client apparatus 102-*j*.

For example, the write controlling unit 906 determines whether or not a process executed by the server 101-*i* is the last process of the series of processes deriving from the request main data 601 transmitted from the client apparatus 102-*j*. When the process executed by the server 101-*i* is the last process, the write controlling unit 906 generates response data 1400 containing the log data and causes the transmitting unit 907 to transmit the response data 1400 to the client apparatus 102-*j*.

In this way, the write controlling unit 906 instructs the client apparatus 102-*j* to write the log data contained in the response data 1400 to the specific storage area 150 in the client apparatus 102-*j*. The response data 1400 is, for example, the data illustrated in FIG. 14. This allows the write controlling unit 906 to cause the client apparatus 102-*j* to record the log data.

The write controlling unit 906 has a function for causing the transmitting unit 907 to transmit a request for executing a third process of the series of processes, to another server 101-*k* in the system where the request includes the first and second log information. In this case, the "third process" is a process to be executed next to the second process of the series of processes requested by the request main data 601. The request for executing the third process means the request main data generated by the server 101-*i* that executed the second process and is, for example, the request main data 1301 as illustrated in FIG. 13. For example, upon receiving a request for executing the second process, the write controlling unit 906 determines whether or not the second process of the series of processes is the last process to be executed within the series of processes. Upon determining that the second process is not the last process to be executed within the series of processes, the write controlling unit 906 causes the transmitting unit 907 to transmit a request for executing the third process of the series of processes, to another server 101-*k* in the system where the request contains the first and second log information.

In this way, the write controlling unit 906 of a server 101-*i* determines whether or not the process executed by the server 101-*i* is the last process of the series of processes requested by the request main data 601 transmitted from the client apparatus 102-*j*. When the process executed by the server 101-*i* is not the last process, the write controlling unit 906 generates request data 1300 containing the log data and causes the transmitting unit 907 to transmit the generated request data 1300 to another server 101-*k* that executes a next process. The request data 1300 is, for example, the data illustrated in FIG. 13. Thus, the write controlling unit 906 transmits, to the another server 101-*k* that executes the next process, the log data generated by the server 101-*i* together with the log data generated by the servers 101 that have already executed the relevant processes, thereby bringing together pieces of log data outputted from the relevant servers 101 at the another server 101-*k* that executes the next process.

The write controlling unit 906 of a server 101-*i* has a function for causing the transmitting unit 907 to transmit a request for executing a second process of a series of processes to another server 101-*k* in the system where the request contains first log information outputted when the executing unit 903 executes a first process. For example, when request data containing log data is generated, the write controlling unit 906 of a server 101-*i* causes the transmitting unit 907 to transmit the generated request data to another server 101-*k* that executes a next process. The generated request data is, for example, request data 1200 as illustrated in FIG. 12.

When the series of processes is of synchronous type, the write controlling unit 906 transmits the request data 1200 to a child server that executes a next process. When the series of processes is of asynchronous type, the write controlling unit 906 of a server 101-*i* transmits request data 1200 to another server 101-*k* that executes a next process. Thus, the write controlling unit 906 transmits, to the another server 101-*k* that executes the next process, the log data generated by the server 101-*i* together with the log data generated by the servers 101 that have already executed relevant processes, thereby bringing together pieces of log data outputted from the relevant servers 101 at the another server 101-*k* that executes the next process.

Although a case in which the specific storage area 150 is located in the client apparatus 102-*j* has been described above, the specific storage area 150 may be located in one of servers 101 or in the storage device 160. In such a case, the request data 600 received from the client apparatus 102-*j* does not include the log-data reporting request 602. A function of the write controlling unit 906 will be described below in conjunction with an example of a case in which the specific storage area 150 is located in one of the serves 101 or in the storage device 160.

The write controlling unit 906 of a server 101-*i* has a function for identifying, of the multiple servers 101, a server 101-*k* having the specific storage area 150 when the received request data 600 does not include the log-data reporting request 602. The write controlling unit 906 further has a function for transmitting the first and second log information to the identified server 101-*k* so that the server 101-*k* writes the first and second log information into the specific storage area 150.

For example, the write controlling unit 906 refers to a write-location table (described below with reference to FIG. 17) to identify server 101-*k* provided with the specific storage area 150 into which the log data is to be written, and instructs the identified server 101-*k* to write the log data into the specific storage area 150. The server 101-*k* instructed to write the log data reserves the specific storage area 150 associated with the client apparatus 102-*j* and writes the log data into the reserved specific storage area 150. At this point, for example, the server 101-*k* creates a storage-location table in which the information indicating the specific storage area 150 is stored in association with the client apparatus 102-*j*. When the specific storage area 150 that is associated with the client apparatus 102-*j* with respect to the log data is reserved, the server 101-*k* instructed to write the log data writes the log data into the specific storage area 150 on the basis of the storage-location table.

When log data for the specific client apparatus 102-*j* is requested from the information processing apparatus 201, the server 101-*k* refers to the specific storage area 150 associated with the client apparatus 102-*j* on the basis of the storage-location table and transmits the relevant log data to the information processing apparatus 201.

As mentioned above, the write controlling unit 906 of a server 101-*i* may be configured to record the log data associated with the client apparatus 102-*j* into another server 101-*k*. As a result, when log data for the client apparatus 102-*j* is requested from the information processing apparatus 201, the server 101-*k* may identify only the log data associated with the client apparatus 102-*j* and transmit the identified log data to the information processing apparatus 201.

When a server 101-*i* is identified as having the specific storage area 150, the write controlling unit 906 of the server 101-*i* also writes the first and second log information to the specific storage area 150 in the server 101-*i*. Thus, the write controlling unit 906 of the server 101-*i* may store the log data within the server 101-*i*.

(An Example of a Write-Location Table)

Now, description will be given of an example of a write-location table that is referred to when the write controlling unit 906 identifies the server 101 or the storage device 160 that is provided with the specific storage area 150.

Figure 17:
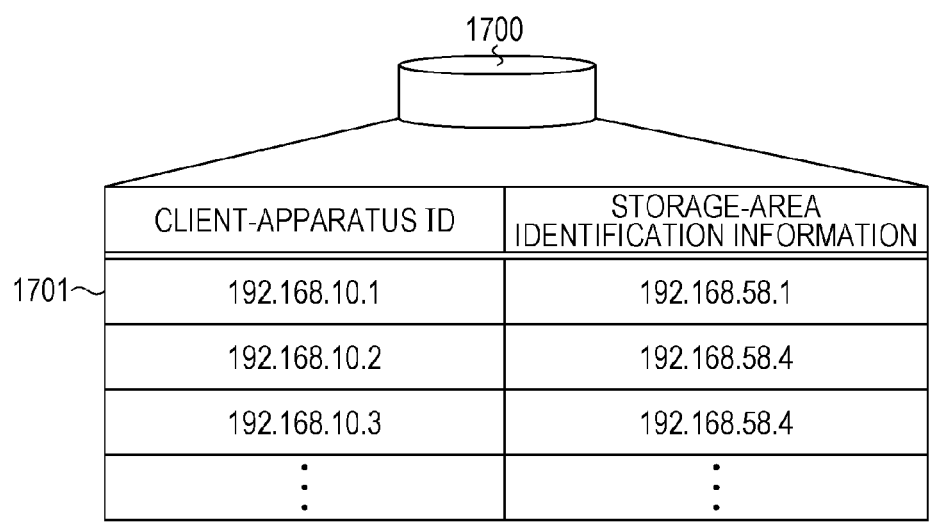
FIG. 17 is a diagram illustrating an example of a write-location table, according to an embodiment.

FIG. 17 is a diagram illustrating an example of a write-location table, according to an embodiment. As illustrated in FIG. 17, a write-location table 1700 includes records each including a "client-apparatus ID" field and a "storage-area identification information" field. That is, the each record stores the "storage-area identification information" identifying a server 101 or a storage device 160 that is provided with the specific storage areas 150 storing the log data relevant to the client apparatuses 102-*j* in association with the "client-apparatus ID". The records may be pre-set by, for example, the administrator of the information processing apparatus 201.

The client-apparatus ID is ID (identification) information identifying the corresponding client apparatus 102-*j*. An example of the client-apparatus ID is an IP address. The storage-area identification information is information identifying the specific storage area 150 into which the log data is to be written. An example of the storage-area identification information is the IP address of the server 101-*i* in which the log data is to be written. The write-location table 1700 is stored, for example, in each of the servers 101-1 to 101-*n* in the log collection system 200. For execution of a series of synchronous processes, it is possible to store the write-location table 1700 only in the server 101-*i* serving as a parent server.

By referring to the write-location table 1700, the server 101-*i* may identify a server 101-*k* or a storage device 160 into which the log data is to be written. For example, by referring to a record 1701 in the write-location table 1700, the server 101-*i* identifies the server 101-*k* or the storage device 160 into which the log data for the client apparatus 102-*j* having the IP address "192.168.10.1" is to be written. In this case, the server 101-*i* may determine that the computer into which the log data is to be written is a computer identified with an IP address "192.168.58.1".

It is also possible to store the write-location table 1700 in the information processing apparatus 201. In this case, by referring to the write-location table 1700, the information processing apparatus 201 may identify the specific storage area 150 into which the log data for the client apparatus 102-*j* for which log data is to be collected is written. For example, by referring to the record 1701 in the write-location table 1700, the information processing apparatus 201 may identify the specific storage area 150 into which the log data for the client apparatus 102-*j* having the IP address "192.168.10.1" is written. In this case, the information processing apparatus 201 determines that the specific storage area 150 into which the log data is written is a computer identified with the IP address "192.168.58.1".

Although description has been given of a case in which the log-data reporting request 602 includes a field identifying a type of log data to be collected and a level of log data to be outputted, the present embodiment is not limited thereto. For example, each server 101-*i* may store therein a table in which and types of log data to be collected and levels of log data to be outputted are associated with IP addresses of the client apparatuses 102-*j* so that each server 101-*i* identifies, in association with the client apparatus 102-*j*, the type of log data to be collected and the level of log data to be outputted.

In such a case, pieces of log data for the client apparatus 102-*j* are aggregated in the specific storage area 150 dedicated to the client apparatus 102-*j*. Accordingly, by referring to the specific storage area 150 for the client apparatus 102-*j* for which pieces of log data are to be collected, the administrator of the information processing apparatus 201 may collect the pieces of log data associated with the client apparatus 102-*j*. In this case, log data for the other client apparatus 102-*j* is not collected. Thus, it is possible to reduce the amount of time taken for the administrator of the information processing apparatus 201 to collect log data. It is also possible to reduce the communication bandwidth used for collecting the relevant log data. In addition, since the administrator of the information processing apparatus 201 need not collect the log data of client apparatuses 102 other than the client apparatus 102-*j* for which the log data is to be collected, the security for log data may be enhanced.

When the log data is stored in the client apparatus 102-*j*, the administrator of the information processing apparatus 201 collects the log data from the client apparatus 102-*j*. In this case, the administrator of the information processing apparatus 201 may automatically collect log data by requesting the client apparatus 102-*j* to transmit the log data. Alternatively, by manipulating the client apparatus 102-*j*, the administrator of the information processing apparatus 201 may copy the log data to a recording medium so as to read the log data from the recording medium using the information processing apparatus 201.

When the log data is stored in a server 101 or in a storage device 160, the administrator of the information processing apparatus 201 identifies the write location of the log data by referring to the write location table 1700 illustrated in FIG. 17, and collects the log data from the identified write location. In this case, the administrator of the information processing apparatus 201 may automatically collect the log data by requesting the server 101 having the identified write location to transmit the log data. The administrator of the information processing apparatus 201 may also read the log data from the storage device 160. Further, it is also possible for the administrator of the information processing apparatus 201 to collect, from the specific storage area 150, only the log data that was generated in a specific period of time.

(An Example of Operational Flowchart of a Client Apparatus for Requesting Collection of Log Data)

Next, description will be given of an example of operational flowchart of a client apparatus for requesting collection of log data according to an embodiment, with reference to FIG. 18.

Figure 18:
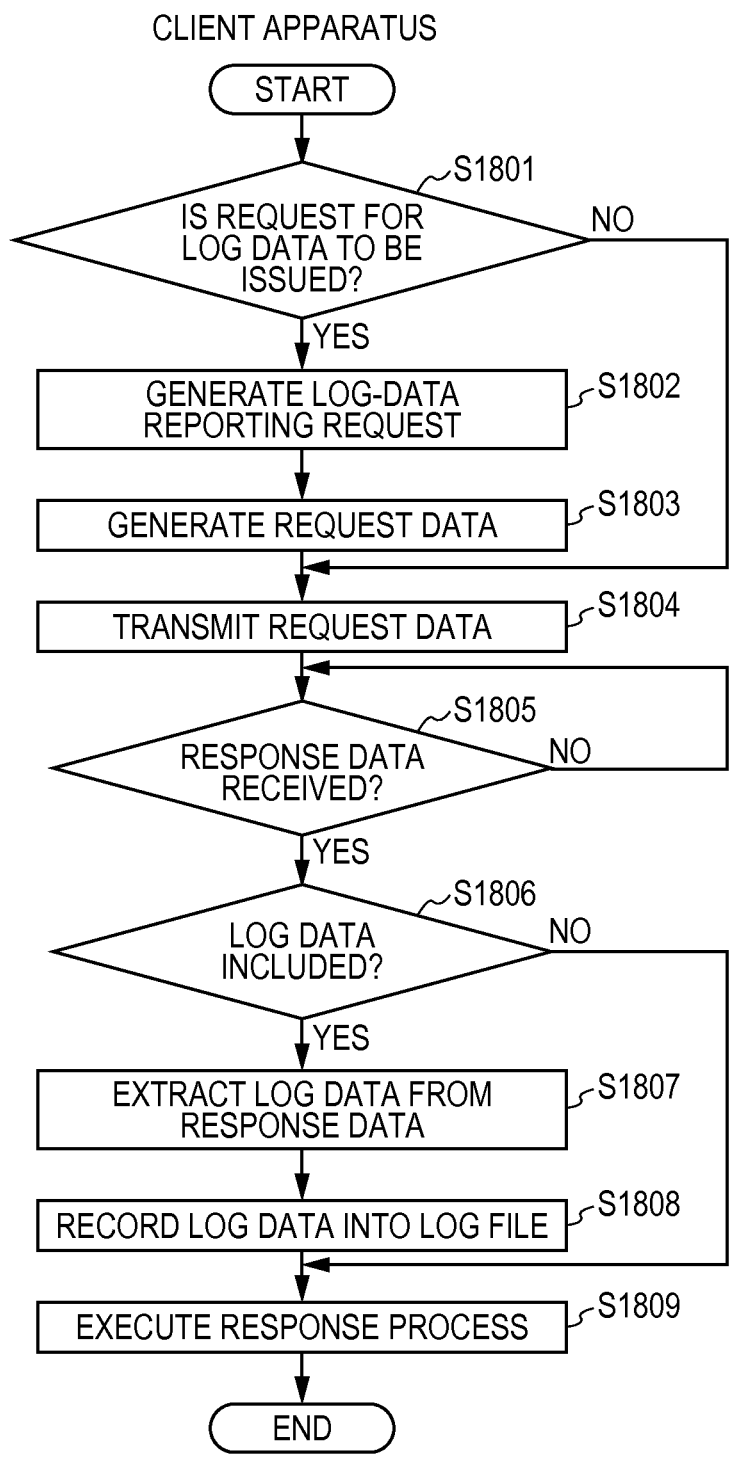
FIG. 18 is a diagram illustrating an example of an operational flowchart of a client apparatus for requesting collection of log data, according to an embodiment.

FIG. 18 is a diagram illustrating an example of an operational flowchart of a client apparatus for requesting collection of log data, according to an embodiment.

In operation S1801, a client apparatus 102-*j* determines whether or not a request for collecting log data is to be issued. When a request for collecting log data is not to be issued (NO in step S1801), the process of the client apparatus 102-*j* proceeds to step S1804.

On the other hand, when a request for collecting log data is to be issued (YES in step S1801), the process proceeds to operation S1802.

In operation S1802, the client apparatus 102-*j* generates log-data reporting request 602.

In operation S1803, the client apparatus 102-*j* generates request data 600.

In operation S1804, the client apparatus 102-*j* transmits the generated request data 600.

In operation S1805, the client apparatus 102-*j* determines whether or not response data 1400 is received. When the response data 1400 is not received (NO in operation S1805), the process returns to operation S1805 in which the client apparatus 102-*j* waits for receiving the response data 1400.

On the other hand, when the response data 1400 is received (YES in operation S1805), the process proceeds to operation S1806.

In operation S1806, the client apparatus 102-*j* determines whether or not log data is included in the received response data 1400. When no log data is included (NO in operation S1806), the process of the client apparatus 102-*j* proceeds to operation S1809.

On the other hand, when log data is included (YES in operation S1806), the process proceeds to operation S1807.

In operation S1807, the client apparatus 102-*j* extracts the log data from the received response data 1400.

In operation S1808, the client apparatus 102-*j* records the extracted log data into a log file thereof.

In operation S1809, the client apparatus 102-*j* executes a response process and ends the request processing. As mentioned above, the client apparatus 102-*j* may issue a request for collection of log data to the server 101-*i* and may receive the result of collecting log data from the server 101-*i*.

(An Example of an Operational Flowchart for a Response Process of a Server)

Next, description will be given of an example of an operational flowchart for a response process of a server, with reference to FIG. 19. Here, the response process is a process executed by a server that has received the request data 600 from a client apparatus, and, for example, is executed by the server 101-1 illustrated in FIG. 10 or 11.

Figure 19:
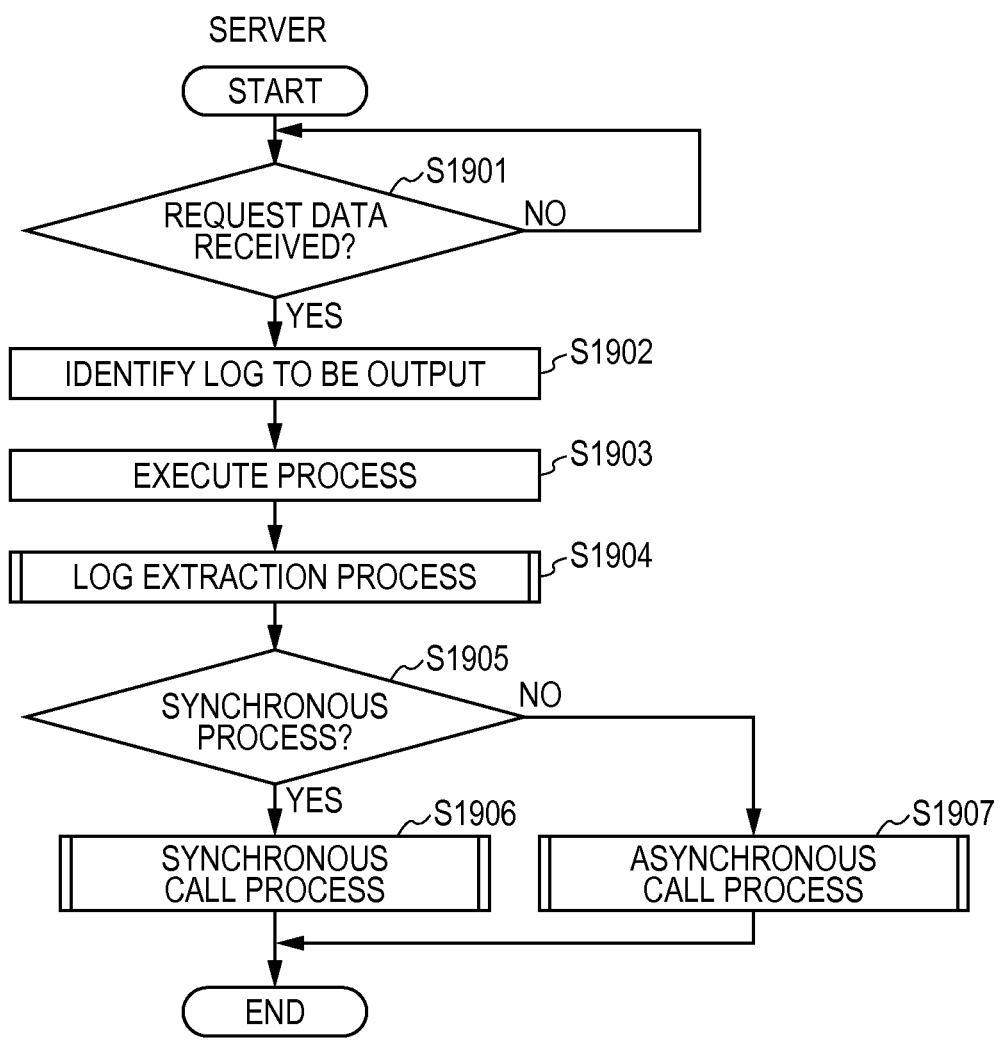
FIG. 19 is a diagram illustrating an example of an operational flowchart for a server to execute a response process, according to an embodiment.

FIG. 19 is a diagram illustrating an example of an operational flowchart for a server to execute a response process, according to an embodiment.

In operation S1901, a server 101-*i* determines whether or not request data 600 is received. When the request data 600 is not received (NO in operation S1901), the process returns to operation S1901 in which the server 101-*i* waits for receiving the request data 600.

On other hand, when the request data 600 is received (YES in operation S1901), the process proceeds to operation S1902.

In operation S1902, the server 101-*i* identifies a log level indicating a set of log classes to be outputted from the server 101-*i*.

In operation S1903, the server 101-*i* executes a process requested by the request data 600.

In operation S1904, the server 101-*i* executes a log-extraction process.

In operation S1905, on the basis of the request data 600, the server 101-*i* determines whether or not the process to be executed is a synchronous process. When the process to be executed is a synchronous process (YES in operation S1905), the server 101-*i* executes synchronous call process in operation S1906 and ends the response process.

On the other hand, when the process to be executed is not a synchronous process (NO in operation S1905), the server 101-*i* executes asynchronous call process in operation S1907 and ends the response process.

As mentioned above, the server 101-*i* may execute a process requested by the request main data 601 contained in the request data 600.

(An Example of an Operational Flowchart for Executing a Synchronous Call Process)

Next, description will be given of an example of an operational flowchart for executing a synchronous call process, with reference to FIG. 20. Here, the synchronous call process is a process executed by a server 101 (for example, a server 101-*i*) in operation S1906 of FIG. 19.

Figure 20:
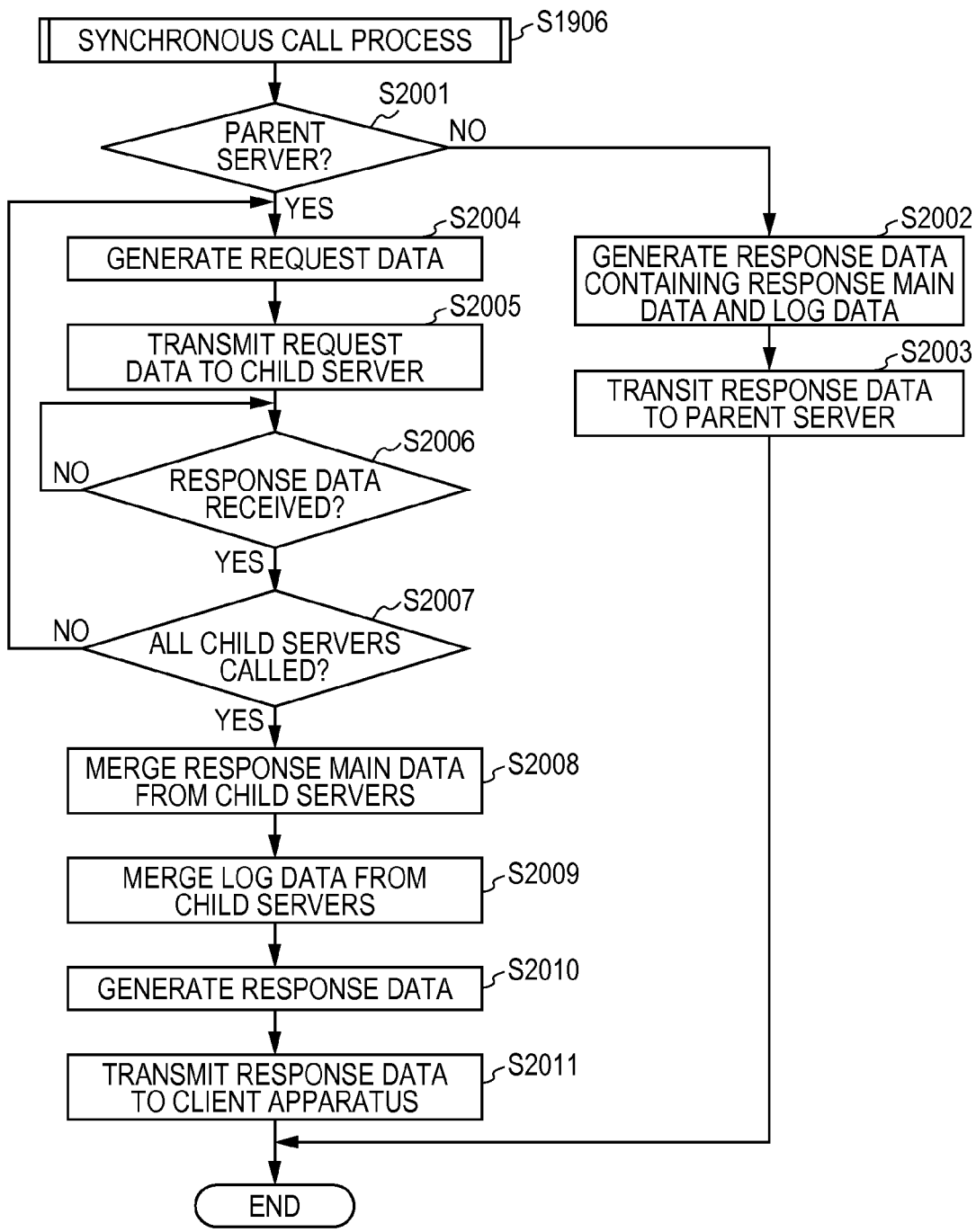
FIG. 20 is a diagram illustrating an example of an operational flowchart for executing a synchronous call process, according to an embodiment.

FIG. 20 is a diagram illustrating an example of an operational flowchart for executing a synchronous call process, according to an embodiment.

In operation S2001, a server 101-*i* determines whether or not the server 101-*i* is a parent server. When the server 101-*i* is not a parent server (NO in operation S2001), the server 101-*i* generates response data including response main data and log data in operation S2002.

In operation S2003, the server 101-*i* transmits the generated response data to a parent server. The server 101-*i* then ends the synchronous call process.

On the other hand, when the server 101-*i* is a parent server (YES in operation S2001), the server 101-*i* generates request data (in operation S2004).

In operation S2005, the server 101-*i* transmits the generated request data to a child server.

In operation S2006, the server 101-*i* determines whether or not response data corresponding to the transmitted request data is received. When the response data is not received (NO in operation S2006), the process returns to operation S2006 in which the server 101-*i* waits for receiving the response data.

On the other hand, when the response data is received (YES in step S2006), the process proceeds to operation S2007

In operation S2007, the server 101-*i* determines whether or not all child servers are called. When not all child servers are called (NO in operation S2007), the process of the server 101-*i* returns to operation S2004.

On the other hand, when all the child servers are called (YES in operation S2007), the server 101-*i* merges the response main data received from the child servers in operation S2008.

In operation S2009, the server 101-*i* merges the log data received from the child servers.

In operation S2010, the server 101-*i* generates response data.

In operation S2011, the server 101-*i* transmits the generated response data to the client apparatus 102-*j*. The server 101-*i* then ends the synchronous call process.

As mentioned above, the server 101-*i* may execute a series of synchronous processes.

(An Example of an Operational Flowchart for Executing an Asynchronous Call Process)

Next, description will be given of an example of an operational flowchart for executing an asynchronous call process, with reference to FIG. 21. Here, the asynchronous call process is a process executed by a server 101 (for example, a server 101-*i*) in operation S1907 of FIG. 19.

Figure 21:
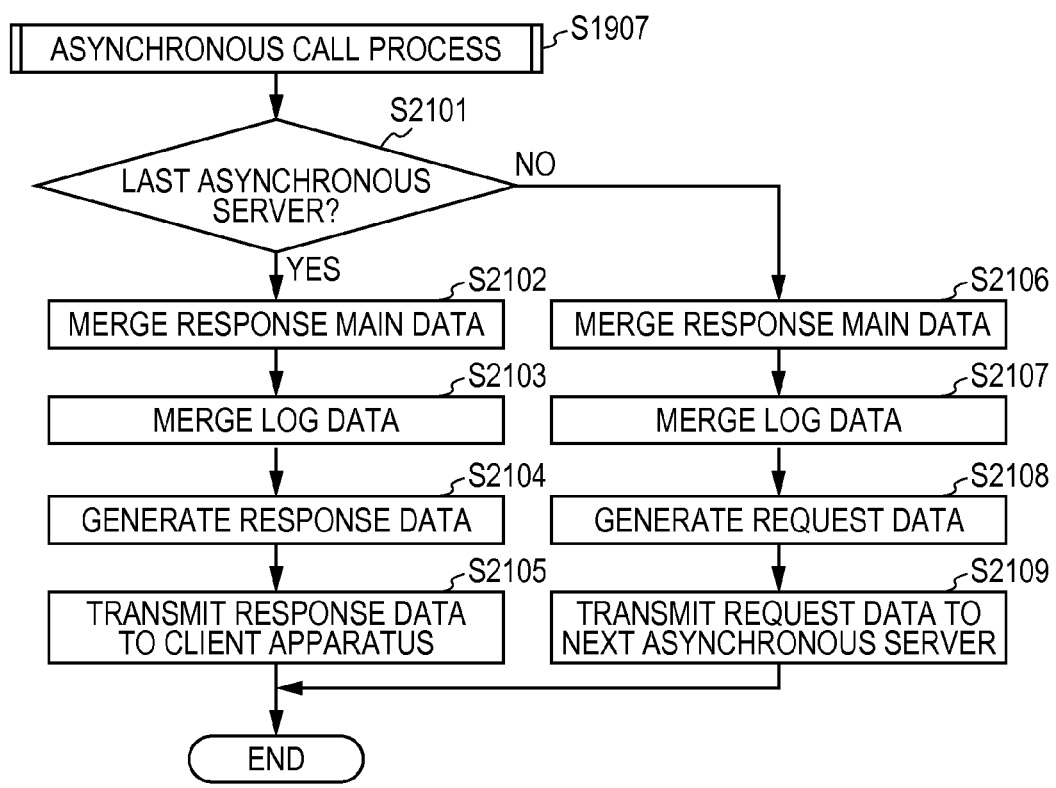
FIG. 21 is a diagram illustrating an example of an operational flowchart for executing an asynchronous call process, according to an embodiment.

FIG. 21 is a diagram illustrating an example of an operational flowchart for executing an asynchronous call process, according to an embodiment.

In operation S2101, a server 101-*i* determines whether or not a server 101-*i* is the last asynchronous server 101 within a series of asynchronous processes requested from a client apparatus 102-*j*. When the server 101-*i* is the last asynchronous server 101 (YES in step S2101), the process proceeds to operation S2102.

In operation S2102, the server 101-*i* merges response main data (the response main data 1401) with received request data (the request data 1300).

In operation S2103, the server 101-*i* merges log data (the log data C 1402).

In operation S2104, the server 101-*i* generates response data 1400.

In operation S2105, the server 101-*i* transmits the generated response data 1400 to the client apparatus 102-*j*. The server 101-*i* then ends the asynchronous call process.

On the other hand, when the local server 101-*i* is not the last asynchronous server 101-*i* (NO in operation S2101), the process proceeds to operation S2106.

In operation S2106, the server 101-*i* merges response main data (the response main data 1202 or 1302) with the received request data.

In operation S2107, the server 101-*i* merges log data (the log data A 1203 or the log data B 1303).

In operation S2108, the server 101-*i* generates request data (the request data 1200 or 1300).

In operation S2109, the server 101-*i* transmits the generated request data (the request data 1200 or 1300) to another server 101-*k*. The server 101-*i* then ends the asynchronous call process.

As mentioned above, the server 101-*i* may execute the series of asynchronous processes.

(An Example of an Operational Flowchart for Executing a Log-Extraction Process)

Next, description will be given of an example of an operational flowchart for executing a log-extraction process, with reference to FIG. 22. Here, the log-extraction process is a process executed by a server 101 in operation S1904 of FIG. 19. When multiple types of log data are to be collected by the server 101-*i*, the log-extraction process is executed on each of types of the collected log data. For example, when a trace log and a sequence log are collected by the server 101-*i*, the log-extraction process is executed on each of the trace log and the sequence log. Although, as mentioned in the above description, various definitions are possible for a log level to be outputted from a server, the following definitions are assumed in this case for convenience of explanation. That is, log level "error log" means a set of log classes including only an error log; log-level "warning log" means a set of log classes including an error log and a warning log; log level "detail log" means a set of log classes including an error log, a warning log, and a detail log; and log level other than "error log", "warning log", and "detail log" means a set of log classes including an error log, a warning log, a detail log, and a debug log.

Figure 22:
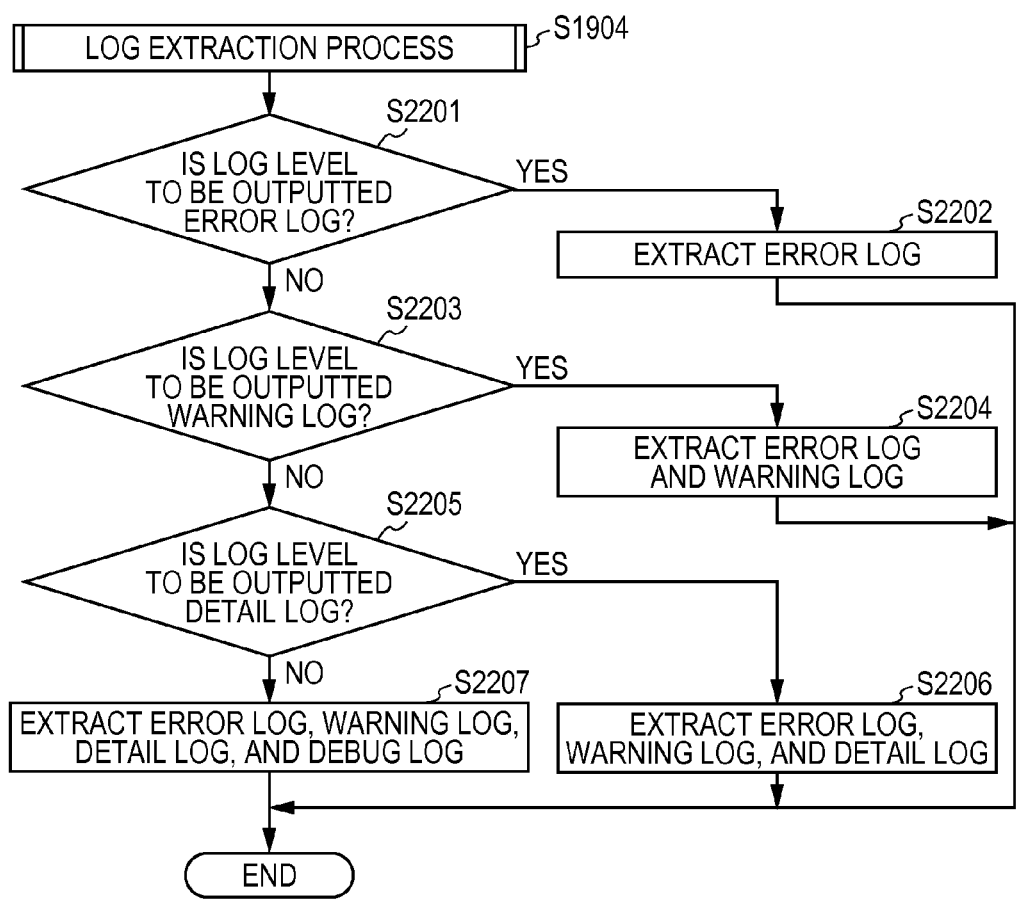
FIG. 22 is a diagram illustrating an example of an operational flowchart for executing a log-extraction process, according to an embodiment.

FIG. 22 is a diagram illustrating an example of an operational flowchart for executing a log-extraction process, according to an embodiment.

In operation S2201, a server 101-*i* determines whether or not the log level to be outputted, which is designated in the log-data reporting request 602, indicates an error log. When the log level to be extracted indicates an error log (YES in operation S2201), the process proceed to operation S2202.

In operation S2202, the server 101-*i* extracts an error log from the collected log data, and ends the log-extraction processing.

On the other hand, when the log level to be outputted does not indicate an error log (NO in operation S2201), the process proceeds to operation S2203.

In operation S2203, the server 101-*i* determines whether or not the log level to be outputted, which is designated in the log-data reporting request 602, indicates a warning log.

When the log level to be outputted indicates a warning log (YES in operation S2203), the process proceeds to operation S2204.

In operation S2204, the server 101-*i* extracts an error log and a warning log from the collected log data, and ends the log-extraction process.

On the other hand, when the log level to be outputted does not indicate a warning log (NO in operation S2203), the process proceeds to operation S2205.

In operation S2205, the server 101-*i* determines whether or not the log level to be outputted, which is designated in the log-data reporting request 602, indicates a detail log. When the log level to be extracted indicates a detail log (YES in step S2205), the process proceeds to operation S2206.

In operation S2206, the server 101-*i* extracts an error log, a warning log, and a detail log from the collected log data, and ends the log-extraction process.

On the other hand, when the log level to be outputted does not indicate a detail log (NO in operation S2205), the process proceeds to operation S2207.

In operation S2207, the server 101-*i* extracts an error log, a warning log, a detail log, and a debug log from the collected log data, and ends the log-extraction process. Thus, the server 101-*i* may extract the log data requested by the client apparatus 102-*j*.

As described above, in the server apparatus, the system, and the log-collection assistance method according to the embodiment, pieces of log data relevant to the client apparatus 102-*j* are aggregated in the specific storage area 150 provided in association with the client apparatus 102-*j*. Accordingly, by referring to the specific storage area 150 associated with the client apparatus 102-*j* for which the log data is to be collected, the administrator of the information processing apparatus 201 may collect pieces of log data with respect to the client apparatus 102-*j* for which the log data is to be collected.

It is also possible to reduce the amount of workload taken for the administrator of the information processing apparatus 201 to identify the servers 101 that executed a series of processes, unlike a case in which after identifying the servers 101 that executed the series of processes, log data are collected from the identified servers 101-*i*. In addition, since the amount of log data to be collected is reduced compared to a case in which the log data generated by the respective servers 101 are collected individually from each of the respective servers 101, it is possible to reduce the amount of time taken for the administrator of the information processing apparatus 201 to collect the log data. Moreover, since the amount of log data to be collected is reduced compared to a case in which the log data generated by the individual servers 101-*i* are collected from the respective servers 101-*i*, the amount of communication for collecting the log data is also reduced, thereby reducing the amount of load of the network 210.

In addition, since the administrator of the information processing apparatus 201 or the user of the client apparatus 102-*j* may beforehand set a log level to be outputted from the servers 101, the total amount of log data to be outputted may be reduced. Also, since the log level to be outputted from the server 101-*i* is set beforehand, the server 101-*i* need not output pieces of log data other than the log data having the log level set beforehand. Thus, the amount of workload needed for the administrator of the information processing apparatus 201 or the user of the client apparatus 102-*j* to collect log data may be reduced.

In addition, since this technology allows the administrator of the information processing apparatus 201 not to collect log data for client apparatuses 102 other than the client apparatus 102-*j* for which the log data is to be collected, the security for log data may be enhanced. For example, the information processing apparatus 201 may authenticate each client apparatus 102-*j* with respect to log data collection so that log data is collected only when the authentication for the log data collection succeeds, thereby enhancing the security for log data.

The server 101-*i* also may cause the client apparatus 102-*j* to store the aggregated log data, and thereafter the administrator of the information processing apparatus 201 may collect the log data from the client apparatus 102-*j*. Accordingly, unlike the case in which the log data generated by the individual servers 101 are collected individually from each of the respective servers 101, the administrator of the information processing apparatus 201 may collect the log data, for example, even when the server 101-*i* included in a cloud environment is removed by provisioning. Further, the administrator of the information processing apparatus 201 may collect log data even when he or she does not recognize that a new server 101 has been added to the cloud environment by provisioning.

Any one of the servers 101, for example, a server 101-*i*, may store the aggregated log data classified for each client apparatus 102-*j*. In such a case, the administrator of the information processing apparatus 201 may collect the log data from the server 101-*i*. This may facilitate management of the log data in comparison with a case in which the log data generated by each of servers 101 is stored in the each server 101. For example, when the server 101-*i* included in the cloud environment is to be removed by provisioning, saving the log data in the server 101-*i* to another server 101-*k* may be performed easily. In this case, it is also possible to save only the log data associated with the specific client apparatus 102-*j*.

Upon execution of a series of processes deriving from a request transmitted from the client apparatus 102-*j*, the server 101-*i* aggregates the log data outputted from the relevant servers 101 and then issues an instruction for writing the log data into the specific storage area 150. Accordingly, compared to a case in which the servers 101 independently issue instructions for writing the log data outputted from the respective servers 101, it is possible to reduce the number of communications between the servers 101 and the storage area (and the number of processes for controlling writing into the specific storage area 150).

In addition, when the log data is stored in a client apparatus 102-*j*, the client apparatus 102-*j* may perform its own processing on the stored log data. Accordingly, the client apparatus 102-*j* may check whether or not the client apparatus 102-*j* is working properly in a system, and may erase the stored log data upon confirming that the client apparatus 102-*j* is working properly, thereby reducing the amount of use of the specific storage area 150.

Additionally, since pieces of log data are aggregated for each series of processes and are written in the specific storage area 150, the administrator of the information processing apparatus 201 may easily extract only the log data relating to the series of process. Further, since pieces of log data are aggregated in the order of generation and are written into the specific storage area 150, the administrator of the information processing apparatus 201 may easily recognize the order of executing processes in the servers 101 with respect to a series of processes deriving from the request main data 601 transmitted from the client apparatus 102-*j*.

The log-collection assistance method described in the above embodiments may be realized by causing a computer, such as a PC or a workstation, to execute prepared programs. The log-collection assistance program may be recorded in a computer-readable recording medium, such as a hard disk, a flexible disk, a CD-ROM (compact disc-read only memory), an MO (magneto optical) disk, or a DVD (digital versatile disc), and the computer may read out the log-collection assistance program therefrom to execute the log-collection assistance program. The log-collection assistance program may also be distributed through a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein a program for causing a computer to execute a procedure for collecting log information from a plurality of servers that execute a series of processes including a first process and a second process required in a first request generated by a client apparatus, the procedure comprising:
   receiving, from a first server that is included in the plurality of servers and that executes the first process required in the first request generated by the client apparatus, a second request for executing the second process required in the first request generated by the client apparatus, the second request including first log information indicating an execution history obtained by an executing of the first process;
   executing the second process;
   generating second log information indicating an execution history obtained by the executing of the second process; and
   controlling writing of the first and second log information into a storage area provided in association with the client apparatus so that both of the first log information and the second log information are able to be read out from the storage area at once.

2. The non-transitory computer readable recording medium of claim 1, wherein the procedure includes:
   instructing the client apparatus to write the first and second log information into the storage area provided for the client apparatus, by transmitting the first and second log information to the client apparatus.

3. The non-transitory computer readable recording medium of claim 1, wherein the procedure includes:
   identifying a second server provided with the storage area from among the plurality of servers; and
   instructing the second server to write the first and second log information into the storage area, by transmitting the first and second log information to the second server.

4. The non-transitory computer readable recording medium of claim 3, wherein the procedure includes:

when the computer is identified as the second server, writing the first and second log information into the storage area provided for the computer.

5. The non-transitory computer readable recording medium of claim 1, wherein the procedure includes:
upon receiving from the first server the second request for executing the second process, determining whether the second process is a process to be executed lastly within the series of processes; and
controlling the writing of the first and second log information into the storage area when it is determined that the second process is a process to be executed lastly within the series of processes.

6. The non-transitory computer readable recording medium of claim 5, wherein the procedure includes:
when it is determined that the second process is not a process to be executed lastly within the series of processes, transmitting a third request for executing a third process of the series of processes to a second server in the plurality of servers, the third request including the first and second log information.

7. The non-transitory computer readable recording medium of claim 6, wherein the procedure includes:
upon receiving the first request from the client apparatus, executing the first process while outputting the first log information indicating an execution history of the first process; and
transmitting a fourth request for executing the second process to a third server in the plurality of servers.

8. The non-transitory computer readable recording medium of claim 1, wherein the first log information includes at least one of an error log, a warning log and a debug log.

9. The non-transitory computer readable recording medium of claim 1, wherein
the second request includes a log level provided by the client apparatus, and
the second log information includes a set of log classes defined by the log level included in the second request.

10. A system for collecting log information from a plurality of servers that execute a series of processes including a first process and a second process required in a first request generated by a client apparatus, the system comprising:
a first server included in the plurality of servers; and
a second server included in the plurality of servers, wherein
the first server includes a first hardware processor that is configured to:
execute the first process required in the first request generated by the client apparatus,
generate first log information indicating an execution history obtained by an executing of the first process, and
transmit a second request for executing the second process of the series of processes and the first log information to the second server; and
the second server includes a second hardware processor that is configured to:
receive the second request which requests execution of the second process required in the first request generated by the client apparatus,
in response to receiving the second request, execute the second process,
generate second log information indicating an execution history obtained by an executing of the second process, and
control writing of the first and second log information into a storage area provided in association with the client apparatus so that both of the first log information and the second log information are able to be read out from the storage area at once.

11. A method for collecting log information from a plurality of servers that execute a series of processes including a first process and a second process required in a first request generated by a client apparatus, the method being performed by one of the plurality of servers, the method comprising:
receiving, from a first server that is included in the plurality of servers and that executes the first process required in the first request generated by the client apparatus, a second request for executing the second process required in the first request generated by the client apparatus, the second request including first log information indicating an execution history obtained by an executing of the first process;
executing the second process, by a hardware processor included in a second server;
generating second log information indicating an execution history obtained by the executing of the second process; and
controlling writing of the first and second log information into a storage area provided in association with the client apparatus so that both of the first log information and the second log information are able to be read out from the storage area at once.

\* \* \* \* \*